(12) United States Patent
Furuya et al.

(10) Patent No.: US 9,575,257 B2
(45) Date of Patent: Feb. 21, 2017

(54) OPTICAL DEVICE, OPTICAL PROCESSING DEVICE, METHOD FOR FABRICATING OPTICAL DEVICE

(71) Applicant: SUMITOMO ELECTRIC INDUSTRIES, LTD., Osaka (JP)

(72) Inventors: Akira Furuya, Yokohama (JP);
Yasunori Murakami, Yokohama (JP);
Koichi Koyama, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/084,216

(22) Filed: Mar. 29, 2016

(65) Prior Publication Data

US 2016/0291253 A1 Oct. 6, 2016

(30) Foreign Application Priority Data

Apr. 1, 2015 (JP) .................................. 2015-075353

(51) Int. Cl.
*G02B 6/36* (2006.01)
*G02B 6/30* (2006.01)
*G02B 6/42* (2006.01)

(52) U.S. Cl.
CPC ............... *G02B 6/30* (2013.01); *G02B 6/3652* (2013.01); *G02B 6/3668* (2013.01); *G02B 6/4206* (2013.01)

(58) Field of Classification Search
CPC ..... G02B 6/262; G02B 6/4214; G02B 6/4206; G02B 6/32; G02B 6/4246; G02B 6/26

USPC ......................................... 385/15, 31, 38, 39
See application file for complete search history.

(56) References Cited

U.S. PATENT DOCUMENTS

| 6,353,250 B1* | 3/2002 | Fukano | H01L 31/02161 |
| | | | 257/184 |
| 6,863,449 B2* | 3/2005 | Kuhara | G02B 6/42 |
| | | | 385/14 |
| 7,665,901 B2* | 2/2010 | Kewitsch | G02B 6/3825 |
| | | | 385/55 |

FOREIGN PATENT DOCUMENTS

JP H04-308804 10/1992

* cited by examiner

*Primary Examiner* — Jennifer Doan
(74) *Attorney, Agent, or Firm* — Smith, Gambrell & Russell, LLP

(57) ABSTRACT

An optical device comprises optical fibers and a holder. The holder includes one end portion, an other end portion, and a supporting portion extending in a direction of a first axis from the one end portion to the other end portion. The one end portion includes a first end face extending along a first reference plane intersecting with the first axis from a side of the holder to cladding regions of the optical fibers; a second end face extending along a second reference plane from the one end portion to the other end portion; and a third end face extending along a third reference plane inclined at an angle of less than 90 degrees and more than zero degrees relative to the first axis. The cladding regions of the optical fibers are disposed at the second end face. The optical fibers have respective tips disposed at the third end face.

9 Claims, 18 Drawing Sheets

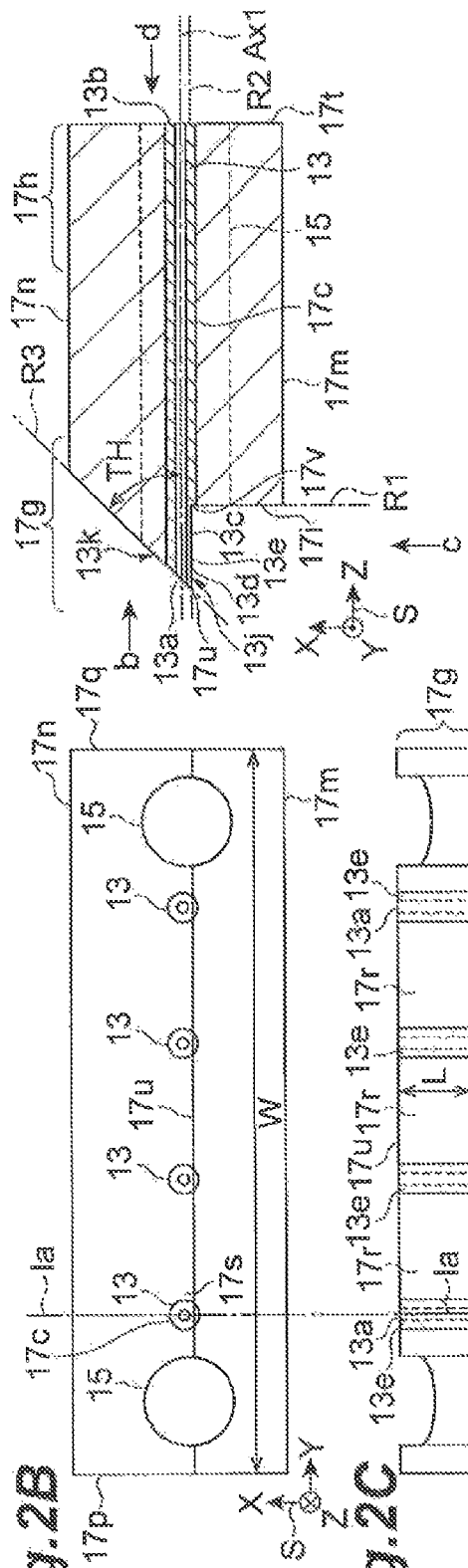
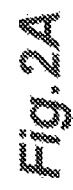
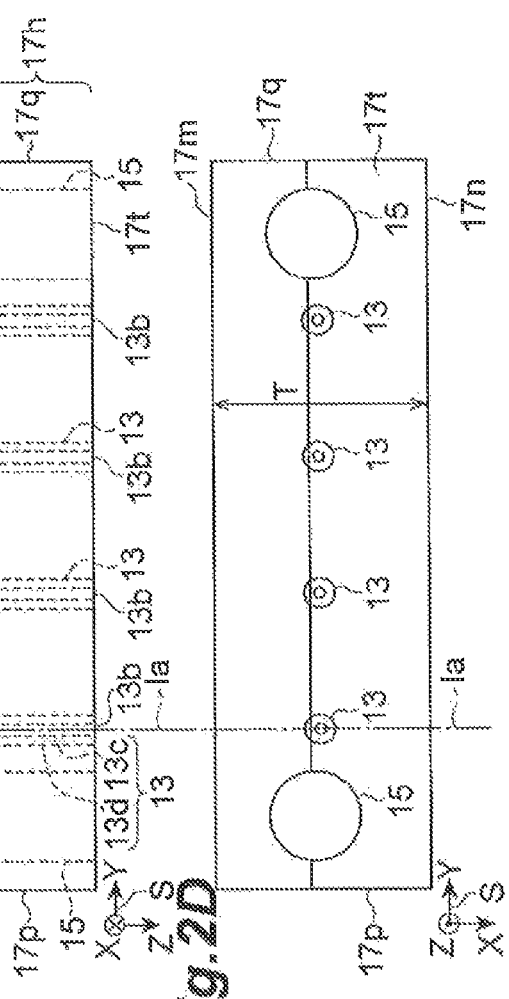

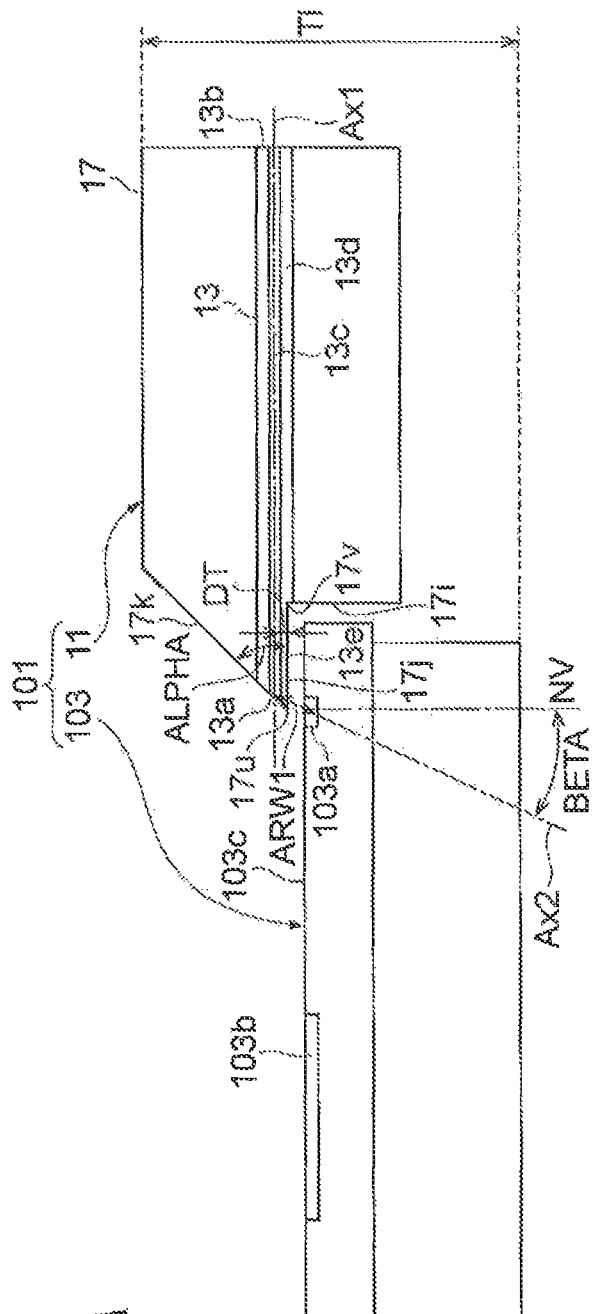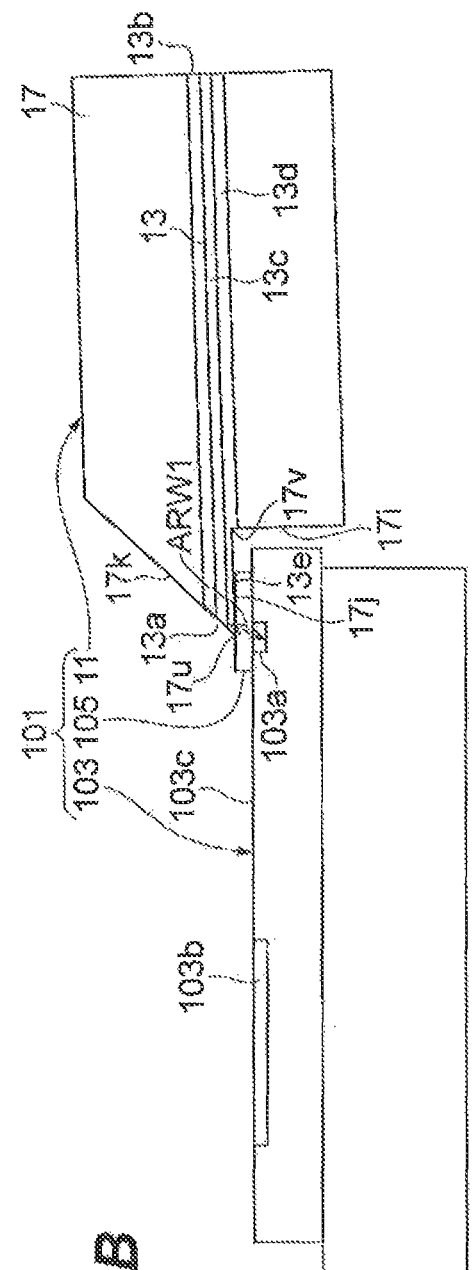

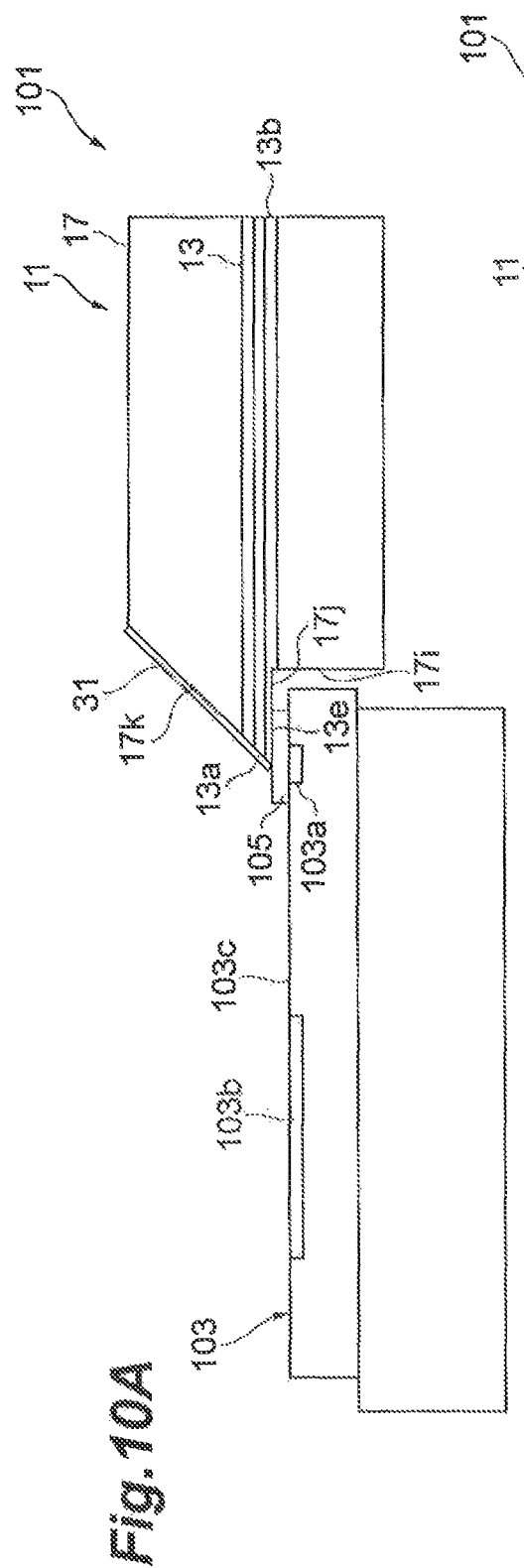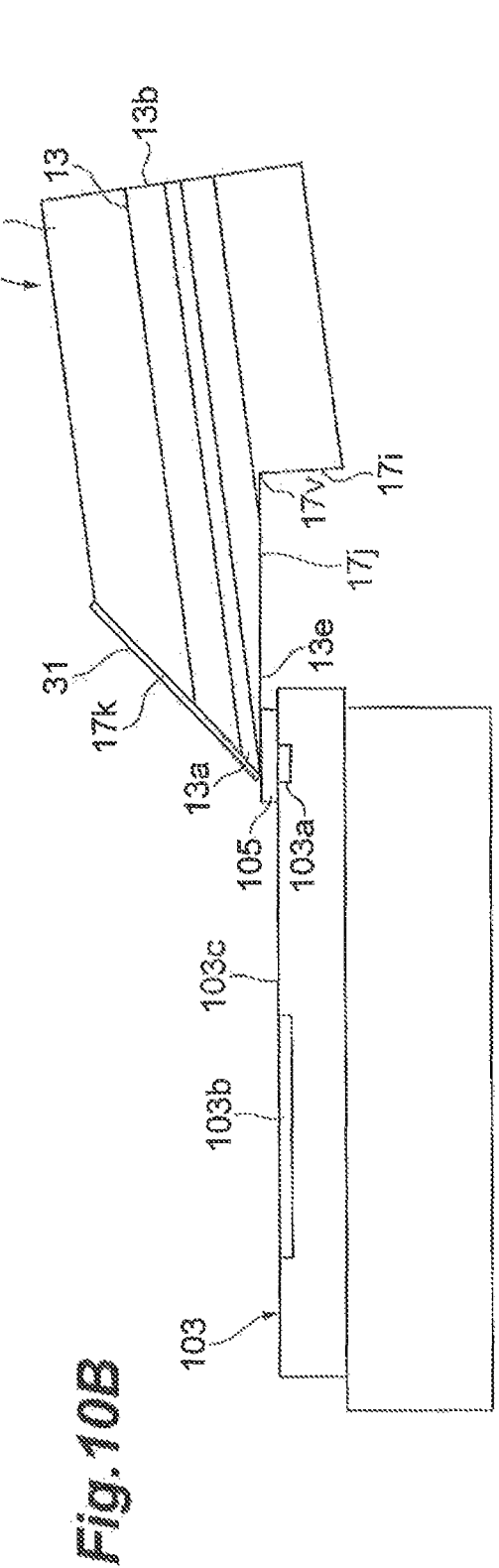

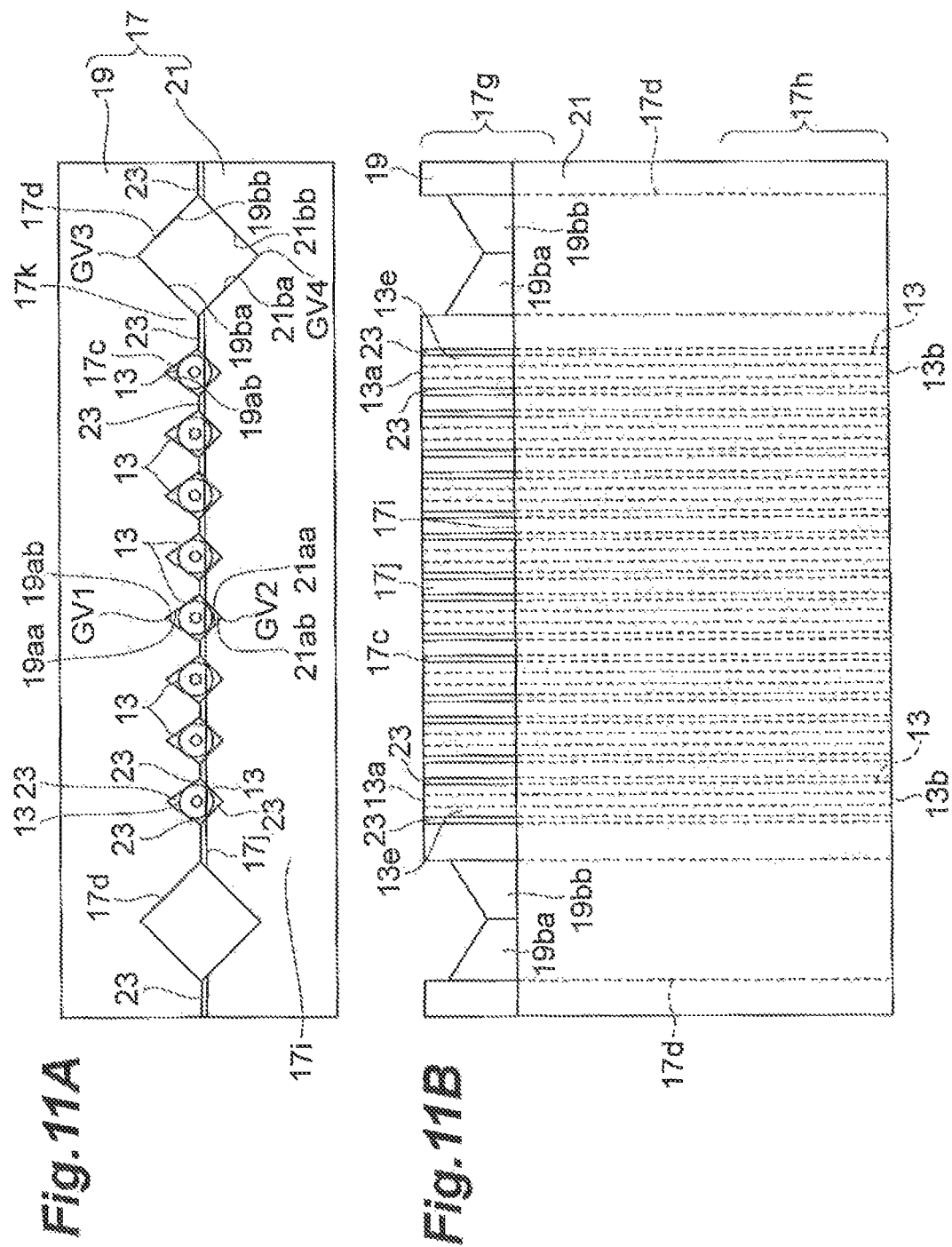

OPTICAL DEVICE, OPTICAL PROCESSING DEVICE, METHOD FOR FABRICATING OPTICAL DEVICE

BACKGROUND OF THE INVENTION

Field of the Invention

The present invention relates to an optical device, an optical processing device, and a method for fabricating an optical device Related Background Art Japanese Patent Application Laid-Open No. 04-308804 publication discloses a structure of an optical device having an end face formed by processing an end of the optical fiber obliquely.

SUMMARY OF THE INVENTION

In the disclosure of Japanese Patent Application Laid-Open No. 04-308804, the end of each optical fiber is processed obliquely with respect to the extending direction of the core of the optical fiber to form an oblique face at the end thereof, and each processed end of the optical fiber is further processed in the extending direction to form a flat side face extending in the clad of the optical fiber. The above processes to form the oblique face and the flat side face involve polishing each optical fiber, so that the polishing may break the optical fibers. When the processed optical fibers are fixed to an optical element so as to be optically coupled to the element, the processed optical fibers have to be handled individually, so that the handling of a bundle of fibers may damage some of the optical fibers. In such a case, what is needed is to reduce the occurrence of the breakage of the fibers. In particular, in order to demonstrate the optical parallel transmission to meet the request of high speed optical communications, the parallel arrangement of the optical fibers and the parallel optical coupling between the optical fibers and the element are needed. The parallel arrangement and coupling request the tips of the processed optical fibers to have the substantially same shape and couple with the element equally.

It is an object of the present invention to provide an optical device having an oblique face at the end thereof which is to be coupled with an optical element. It is another object of the present invention to provide an optical processing device including the optical device. It is still another object of the present invention to provide a method for fabricating the optical device.

An optical device according to one aspect of the present invention includes: one or more optical fibers; and a holder including one end portion, another end portion, and a supporting portion supporting the optical fibers, the supporting portion extending from the one end portion in a direction of a first axis, the first axis extending from the one end portion to the other end portion; the one end portion including a first end face, a second end face and a third end face, the first end face extending along a first reference plane from a side of the holder to cladding regions of the optical fibers, the first reference plane intersecting with the first axis, the second end face extending along a second reference plane, the second reference plane extending from one of the one end portion and the other end portion to the other, and the third end face extending along a third reference plane, the third reference plane being inclined at an angle of less than 90 degrees and more than zero degrees with respect to the first axis, the cladding regions of the optical fibers being disposed at the second end face, the optical fibers having respective tips disposed at the third end face, the second end face of the holder including 21-th. areas made of material of the holder, and the third end face of the holder including a 31-th area surrounding the tips of the optical fibers.

An optical processing device according to another aspect of the present invention includes: a semiconductor optical device including an optical coupling element and an optical processing element, the optical processing element being connected to the optical coupling element, an optical device provided on the semiconductor optical device. The optical device includes: one or more optical fibers; and a holder including one end portion, another end portion, and a supporting portion supporting the optical fibers, the supporting portion extending from the one end portion in a direction of a first axis, the first axis extending from the one end portion to the other end portion; the one end portion including a first end face, a second end face and a third end face, the first end face extending along a first reference plane from a side of the holder to cladding regions of the optical fibers, the first reference plane intersecting with the first axis, the second end face extending along a second reference plane, the second reference plane extending from one of the one end portion and the other end portion to the other, and the third end face extending along a third reference plane, the third reference plane being inclined at an angle of less than 90 degrees and more than zero degrees with respect to the first axis, the cladding regions of the optical fibers being disposed at the second end face, the optical fibers having respective tips disposed at the third end face, the second end face of the holder including 21-th areas made of material of the holder, and the third end face of the holder including a 31-th area surrounding the tips of the optical fibers. The optical coupling element is coupled to one of the optical fibers of the optical device through the second end face.

A method for fabricating an optical device according to still another aspect of the present invention includes the steps of: forming a first body part including a supporting member and an optical fiber part, the supporting member having one end and another end, the optical fiber part being supported in the supporting member by the supporting member, and the optical fiber part extending in the supporting member in a first direction from the one end to the other end; after forming the first body part, processing the optical fiber part and the one end of the supporting member to form a second body part including a first face and a second face, the first face extending along a first reference plane intersecting with the first direction, the second face extending in a direction from the one end to the other end along a second reference plane intersecting with the first reference plane; after forming the second body part, processing the one end of the supporting member and the optical fiber part to form a third body part including a third face, the third face extending along a third reference plane inclined with respect to the first and second reference planes, the second face including a cladding side of the optical fiber part, the third face including an end face of the optical fiber part.

BRIEF DESCRIPTION OF THE DRAWINGS

The above-described objects and the other objects, features, and advantages of the present invention become more apparent from the following detailed description of the preferred embodiments of the present invention proceeding with reference to the attached drawings.

FIG. 2A is a cross sectional view showing an optical device according to the present embodiment.

FIG. 2B is a front view showing the optical device according to the present embodiment.

FIG. 2C is a bottom view showing the optical device according to the present embodiment.

FIG. 2D is a rear view schematically showing the optical device according to the present embodiment.

FIG. 5A is a schematic view showing an optical processing device according to the present embodiment.

FIG. 5B is a schematic view illustrating the optical processing device according to the present embodiment.

FIG. 10A is a schematic view illustrating an optical device and a silicon photonics device according to the present embodiment.

FIG. 10B is a schematic view illustrating an optical device and a silicon photonics device according to the present embodiment.

FIG. 11A is a view showing the structure of a holder according to the present embodiment.

FIG. 11B is a view showing the structure of a holder according to the present embodiment.

DETAILED DESCRIPTION

Figure 1A:
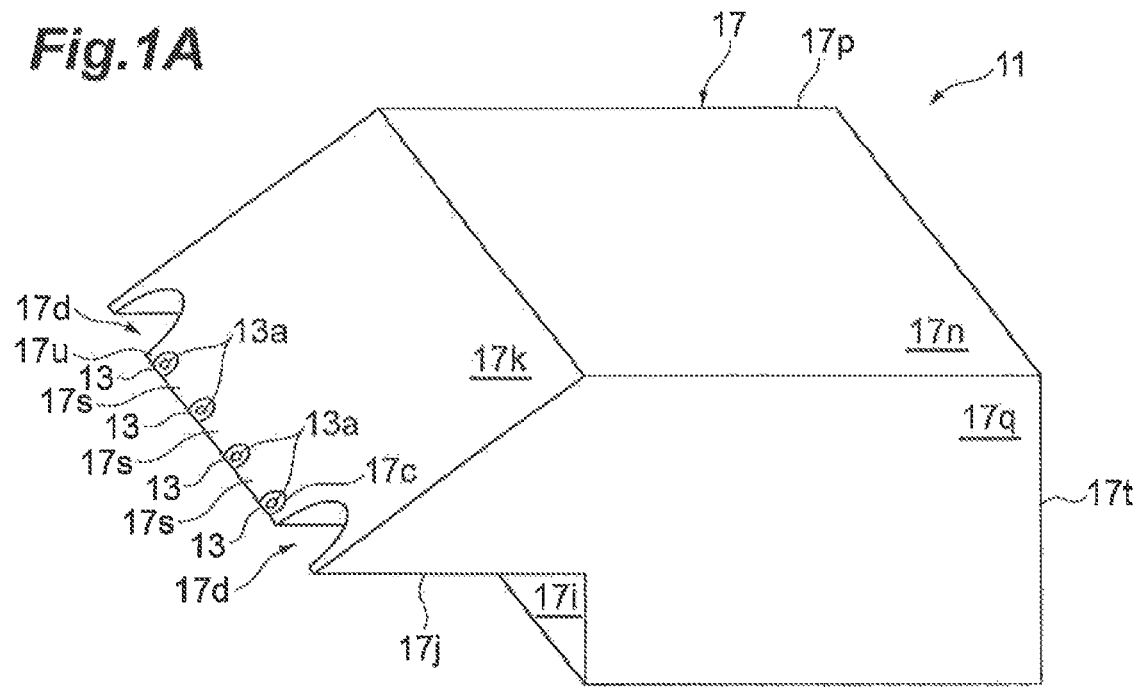
FIG. 1A is a perspective view schematically showing an optical device according to the present embodiment.

Some specific embodiments according to the above aspects will be described below.

An optical device according to the present embodiment comprises: one or more optical fibers; and a holder including one end portion, another end portion, and a supporting portion supporting the optical fibers, the supporting portion extending from the one end portion in a direction of a first axis, the first axis extending from the one end portion to the other end portion; the one end portion including a first end face, a second end face and a third end face, the first end face extending along a first reference plane from a side of the holder to cladding regions of the optical fibers, the first reference plane intersecting with the first axis, the second end face extending along a second reference plane, the second reference plane extending from one of the one end portion and the other end portion to the other, and the third end face extending along a third reference plane, the third reference plane being inclined at an angle of less than 90 degrees and more than zero degrees with respect to the first axis, the cladding regions of the optical fibers being disposed at the second end face, the optical fibers having respective tips disposed at the third end face, the second end face of the holder including 21-th areas made of material of the holder, and the third end face of the holder including a 31-th area surrounding the tips of the optical fibers.

In the optical device, each of the optical fibers has a flat side extending along the second reference plane and disposed at the second end face of the holder. Each of the optical fibers has an end face extending along the third reference plane and disposed at the third end face of the holder. The second end face of the holder has a number of 21-th areas made of material of the holder, and the sides of the optical fibers extend along the second reference plane between the adjacent first 21-th areas. The third end face of the holder has a 31-th area made of material of the holder, and the end faces of the optical fibers are arranged along the third reference plane and are surrounded by the 31-th area. This structure can position the optical fibers to the holder, and allows the 31-th area and the end faces of the optical fiber both to extend along the third reference plane, and the first 21 areas and the side faces of the optical fibers both extend along the second reference plane. Optical beams propagating through the optical device are reflected by the respective end faces of the optical fibers to change the travelling direction. The optical beams of the optical device propagate in the parts of the optical fibers provided between the respective sides and the end faces of the optical fibers. The present optical device uses the oblique end faces of the optical fibers for the reflection of the optical beams and allows the end faces of the optical fibers to be optically coupled to an external optical element.

In the optical device according to the embodiment, the optical fibers are arranged along a reference plane intersecting with the one end portion and the other end portion, the 21-th areas of the second end face of the holder are located between the cladding regions of the optical fibers, and the tips of the optical fibers are arrayed at a connecting edge which the second end face and the third end face share.

In the optical device, the arrayed optical fibers extend along the second reference plane in the direction from the end of the holder to the other end. The 21-th areas of the second end face of the holder is located between the sides of the two optical fibers adjacent to each other, and parts of the 31 area in the third end face of the holder protrude between the end faces of the optical fibers that are adjacent to each other. The flat sides of the optical fibers and the 21-th areas are alternatively arranged along the second reference plane. The end faces of the optical fibers and the 31-th area are arranged along the third reference plane. The end faces of the optical fibers located on the third reference plane are used for reflection of respective optical beams propagating through the optical device. The optical beams associated with the optical device pass through the respective flat sides of the optical fibers. The present optical device uses the end faces of the optical fibers for reflection of light to allow the end faces of the optical fibers to optically couple to an external optical element.

In the optical device according to the present embodiment, the holder has a guiding portion, and the guiding portion extends from the one end portion to the other end portion in the direction of the first axis.

In the optical device, the guide portion is positioned with respect to the supporting portions for the optical fibers in the optical device. Hence, the guide portion of the optical device serves to align the optical device with the optical element.

In the optical device according to the present embodiment, the holder further includes a protective film disposed on the third end face, and the protective film includes at least one of metal or material having a refractive index lower than that of the optical fibers.

In the optical device, the protective film is effective in preventing a refractive-index adjusting member provided between the optical device and the optical element from coming around the end faces of the optical fibers.

In the optical device according to the present embodiment, each of the optical fibers has a first portion and a second portion, the first portion extends in the holder, and the second portion extends outward from the other end portion.

The optical device demonstrates a pigtail-type structure.

In the optical device according to the present embodiment, each of the optical fibers extends from the one end portion to the other end portion in the holder.

The optical device demonstrates a stub type structure.

An optical processing device according to the embodiment comprises a semiconductor optical device including an optical coupling element and an optical processing element, the optical processing element being connected to the optical coupling element; an optical device provided on the semiconductor optical device. The optical device comprises: one or more optical fibers; and a holder including one end portion, another end portion, and a supporting portion supporting the optical fibers, the supporting portion extending from the one end portion in a direction of a first axis, the first axis extending from the one end portion to the other end portion, the one end portion including a first end face, a second end face and a third end face, the first end face extending along a first reference plane from a side of the holder to cladding regions of the optical fibers, the first reference plane intersecting with the first axis, the second end face extending along a second reference plane, the second reference plane extending from one of the one end portion and the other end portion to the other, and the third end face extending along a third reference plane, the third reference plane being inclined at an angle of less than 90 degrees and more than zero degrees with respect to the first axis, the cladding regions of the optical fibers being disposed at the second end face, the optical fibers having respective tips disposed at the third end face, the second end face of the holder including 21-th areas made of material of the holder, and the third end face of the holder including a 31-th area surrounding the tips of the optical fibers. the optical coupling element being coupled to one of the optical fibers of the optical device through the second end face.

The optical processing device has a small thickness which the optical device and the semiconductor optical device coupled with each other have. The optical processing device allows the end faces of the optical fibers to reflect respective light beams propagating through the optical fibers thereby changing their traveling directions. The propagating light beams pass through respective optical fiber portions from one of the end faces of the optical fibers and the flat sides of the optical fibers to the other. The optical device can reflect light beams at the respective oblique end faces of the optical fibers to allow these oblique end faces to optically couple with the optical element. The optical processing device can form the optical coupling between the optical device and the semiconductor optical device, and the combination of the optical device with the semiconductor optical device can provide the optical processing device with a small height.

The optical processing device according to the present embodiment further comprises a resin body provided between the second end face of the optical device and the optical coupling element of the optical processing device, the resin body being optically transparent in a wavelength of light to be processed by the optical processing device.

The light processing device has an excellent optical coupling between the optical device and the semiconductor optical device.

A method for fabricating an optical device according to the present embodiment comprises the steps of: forming a first body part including a supporting member and an optical fiber part, the supporting member having one end and another end, the optical fiber part being supported in the supporting member by the supporting member, and the optical fiber part extending in the supporting member in a first direction from the one end to the other end; after forming the first body part, processing the optical fiber part and the one end of the supporting member to form a second body part including a first face and a second face, the first face extending along a first reference plane intersecting with the first direction, the second face extending in a direction from the one end to the other end along a second reference plane intersecting with the first reference plane; after forming the second body part, processing the one end of the supporting member and the optical fiber part to form a third body part including a third face, the third face extending along a third reference plane inclined with respect to the first and second reference planes, the second face including a cladding side of the optical fiber part, the third face including an end face of the optical fiber part.

In the method of fabricating an optical device, the processing of the first body part allows the first body part to be provided with the second face that meets the first side and at which the cladding side of the optical fiber appears. The processing of the second body part allows the second body part to be provided with the third face that meets the second face and at which one end face of the optical fiber part is located.

The teachings of the present invention will readily be understood in view of the following detailed description with reference to the accompanying drawings illustrated by way of example. Embodiments of an optical device, an optical processing device, and a method of fabricating an optical device will be described below with reference to the accompanying drawings. When possible, parts identical to each other will be referred to with reference symbols identical to each other.

Figure 1B:
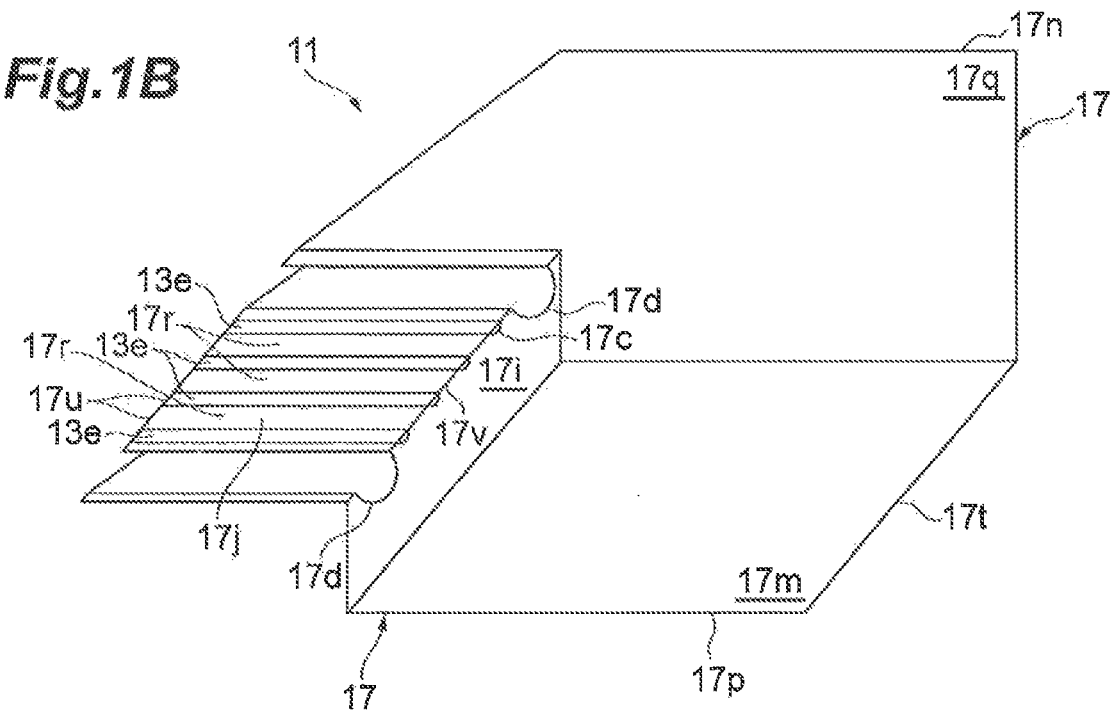
FIG. 1B is a perspective view schematically showing an optical device according to the present embodiment.

FIGS. 1 and 2 schematically illustrate an optical device according to the present embodiment. FIGS. 1A and 1B are perspective views each showing the appearance of the optical device 11. FIGS. 2B, 2C and 2D are depicted as respective planar representations, seen from several directions, to show the structure of the optical device 11. FIG. 2A is a cross-sectional view taken along the line Ia-Ia shown in FIGS. 2B, 2C and 2D. In FIG. 2A, three arrows ("b", "c" and "d") are shown, and these arrows ("b," "c" and "d") indicate the respective sight lines for the FIGS. 2B, 2C and 2D. The optical device 11 comprises one or more optical fibers 13, and the holder 17. Each of the optical fibers 13 includes one end 13a and another end 13b. Each optical fiber 13 includes a core 13c and a cladding 13d. The holder 17 has one or more supporting portion 17c which can support the corresponding optical fibers 13, and the holder 17 includes one end portion 17g and the other end 17h. The supporting portions 17c of the holder 17 extend from one end portion 17g in the direction of the first axis Ax1 from the one end portion 17g to the other end portion 17h. The one end portion 17g has a first end face 17i, a second end face 17j, and a third end face 17k. The holder 17 has, in the present embodiment, a first side 17m, a second side 17n, a third side 17p and a fourth side 17q. The first end face 17i, the second end face 17j and the third end face 17k constitute the one end face of the one end portion 17g. The other end portion 17h has the fourth end face 17t. The fourth end face 17t constitutes, in the present embodiment, the other end face of the other end portion 17h. The one end face of the one end portion 17g is opposite to the other end face of the other end portion 17h. The first end face 17i extends from the first side face 17m of the holder 17 to the cladding sides 13e of the optical fibers 13 along a first reference plane R1 intersecting the first axis Ax1 (e.g., at an angle of right angle). The second end face 17j extends along a second reference plane R2 intersecting the one end portion 17g and the other end portion 17h. The third end face 17k extends along the third reference plane R3 that is inclined at an angle TH smaller than 90 degrees and greater than zero degrees relative to the first axis Ax1. The cladding sides 13d of the optical fibers 13 are located at the second end face 17j. The ends 13a of the optical fibers 13 are positioned on the third end face 17k. The second end face 17j of the holder 17 includes the first 21-th areas 17r made of material of the holders 17. The third end face 17k of the holder 17 includes a 31-th area 17s, surrounding faces of the ends 13a of the optical fibers 13, which is made of material of the holder 17.

As shown in FIGS. 1A, 1B, 2A, 2B, 2C and 2D, in the optical device 11, the optical fibers 13 extend in the direction from one end 17g to the other end 17h along the second reference plane R2. Each optical fiber 13 has a cladding side 13e, which extends along the second reference plane R2 and positioned in the second end face 17j of the holder 17. The end 13a of each optical fiber 13 (end face) extends along the third reference plane R3 and positioned at the third end face 17k of the holder 17. The second end face 17j of the holder 17 has the 21-th areas 17r made of material of the holders 17, and the cladding sides 13e of the optical fibers 13 extends between the first 21-th areas 17r along the second reference plane R2. The third end face 17k of the holder 17 has the 31-th area 17s made of material of the holder 17, and extensions of the 31-th area 17s extend along the third reference plane R3 between the ends 13a of the optical fibers 13. In the present structure, each individual optical fiber 13 is positioned to the holder 17, and the ends 13a of the optical fibers 13 and the 31-th area 17s both extend along the third reference plane R3. The cladding sides 13e of the optical fibers 13 and the 21-th areas 13r extend along the second reference plane R2. Reflection caused by the ends 13a of the optical fibers 13 is effective in, for example, changing the direction of light beams, which propagate through the optical device 11. For example, light beams propagating through the optical fibers 13 are reflected by the faces of the ends 13a, and the reflected light beams pass through the cladding sides 13e of the optical fibers 13. Light beams entering the optical fibers 13 through the cladding sides 13e are reflected by the faces of the ends 13a of the optical fibers 13, and the reflected light beams propagate through the optical fibers 13. The optical device 11 uses the oblique faces of the optical fibers 13 to reflect the light beams, and allows the end faces of the optical fibers 13 to be optically coupled with an optical element, such as the semiconductor optical device 103. In the optical device 11 shown in FIGS. 1A, 1B, 2A, 2B, 2C and 2D, the optical fibers 13 are arranged along the second reference plane R2. The 21-th areas 17r of the second end face 17j of the holder 17 are disposed between the cladding sides 13e of the optical fiber 13. The ends 13a of the optical fibers 13 are arranged in the connecting edge 17u where the second end face 17j and the third end face 17k meet. The 21-th areas 17r and the 31-th area 17s lie between the adjacent optical fibers 13, and the arrangement of these faces allows the holder 17 to securely hold the outer surfaces of the optical fibers 13. This holding can prevent the misorientation of the individual optical fibers 13. The arrangement of the 21-th areas 17r and the 31-th area 17s of the holder 17 allows the cladding sides 13e of optical fibers 13 to be oriented in the same direction over all the fiber array, and the optical fibers 13 are arranged along a single plane. This arrangement makes it easy to protect the cladding surfaces to prevent the coating film from coming around on the cladding surfaces 13e to cover them in the step of forming a coating film on the oblique surfaces of the optical fibers 13.

In the optical device 11, the arrayed optical fibers 13 extend along the second reference plane R2 in the direction of from the one end 17g to the other end portion 17h. FIGS. 2A, 2B, 2C and 2D, there is shown an orthogonal coordinate system S, and the optical fibers 13 are arranged in parallel to the plane defined by the Y-axis and Z-axis of the orthogonal coordinate system S in the present embodiment. Each of the 21-th areas 17r of the second end 17j of the holder 17 is disposed between the cladding sides 13e of the adjacent optical fibers 13, and the 31-th area 17s of the third end 17k of the holder 17 protrudes between the oblique faces of one ends 13a of the optical fibers 13. The cladding sides 13e of the optical fibers 13 and the 21-th areas 17r are arranged along the second reference plane R2. The ends 13a of the optical fibers 13 and the 31-th area 17s are arranged along the third reference plane R3. The light beams propagating through the optical fibers 13 in the optical device 11 are reflected by the end faces of the respective optical fibers 13 located at the third reference plane R3 to change the travelling directions thereof. The light beams reflected by the ends of the optical fibers 13 in the optical device 11 are emitted through the respective cladding sides 13e of the optical fibers 13 outside of the optical device 11. Alternatively, light beams incident on the optical fibers 13 through the is respective cladding sides 13e are reflected by the ends of the optical fibers 13 to propagate along the respective core of the optical fibers 13. The optical device 11 allows the oblique end faces at the ends 13a of the optical fibers 13 to reflect the respective light beams, thereby optically coupling the end 13a of each optical fiber 13 with the optical element.

The holder 17 may be provided with a guide portion 17d. The guide portion 17d extends in the direction of the first axis Ax1 from one end 17g to the other end 17h. In the optical device 11, the guide portion 17d is positioned with respect to the supporting portions 17c for the optical fibers 13 in the optical device 11. The guide portion 17d of the optical device 11 serves to position the optical device 11 to an optical element. In the present embodiment, the guide portion 17d may have a hole extending in the direction of the first axis Ax1 from the one end 17g to the other end 17h.

In the present example, each optical fiber 13 may include a single mode optical fiber made of quartz. Material of the holder 17 may be made of for example, a glass material or polyphenylene sulfide containing silica filler (with heat-resistant temperature of 150 degrees Celsius). The pitch of the optical fibers 13 is, for example, 250 µm, and the guide portion 17d for a guide pin is, for example, 700 µm in diameter. The length L of the 21-th areas 17r for supporting the cladding sides 13e is, for example, 1.5 mm, which is a distance defined in the direction from the connection part 17u to the connection part 17v in the second end face 17j, and may be 1 mm or more for proper optical coupling. The width of the 31-th area 17s is for properly holding optical fibers may be 3 mm or more. The width W of the holder 17 may be, for example, 6.4 mm, and the thickness T of the holder 17 may be, for example, 2.4 mm.

Figure 3A:
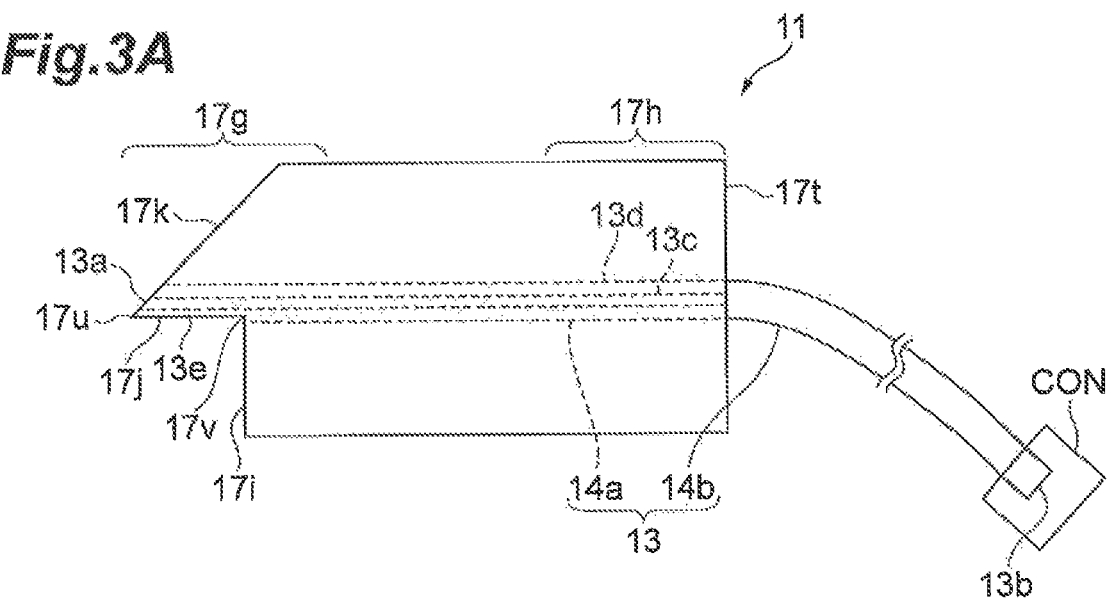
FIG. 3A illustrates an exemplary structure of an optical device according to the present embodiment.
Figure 3B:
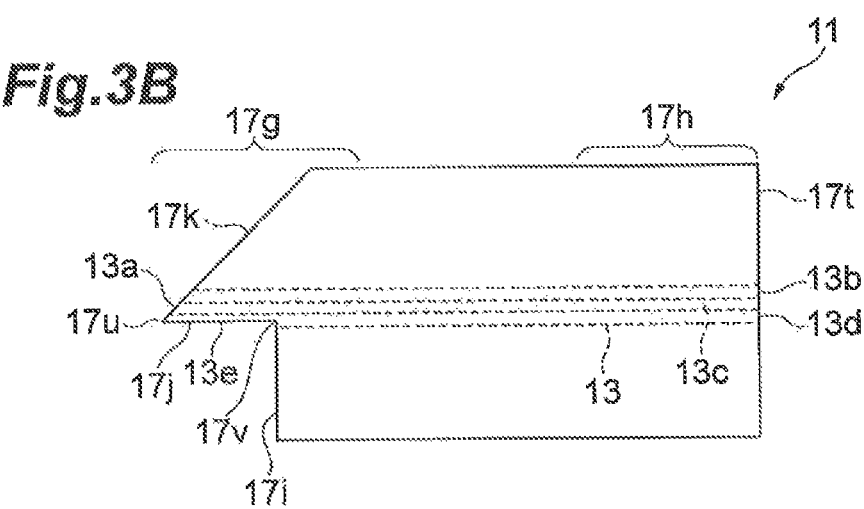
FIG. 3B is a view illustrating an exemplary structure of an optical device according to the present embodiment.

FIGS. 3A and 3B are diagrams illustrating exemplary structures for an optical device according to the present embodiment. Referring to FIG. 3A, one structure for the optical device 11 is shown. In the optical device 11 of this structure, each optical fiber 13 may include a first portion 14a extending in the holder 17, and a second portion 14h extending from the other end face of the holder 17. In the embodiment, the second portion 14b include the other end 13b of the optical fiber 13, and an optical connector CON is provided at the other end 13b. This structure demonstrates a pigtail-type optical device.

Figure 4A:
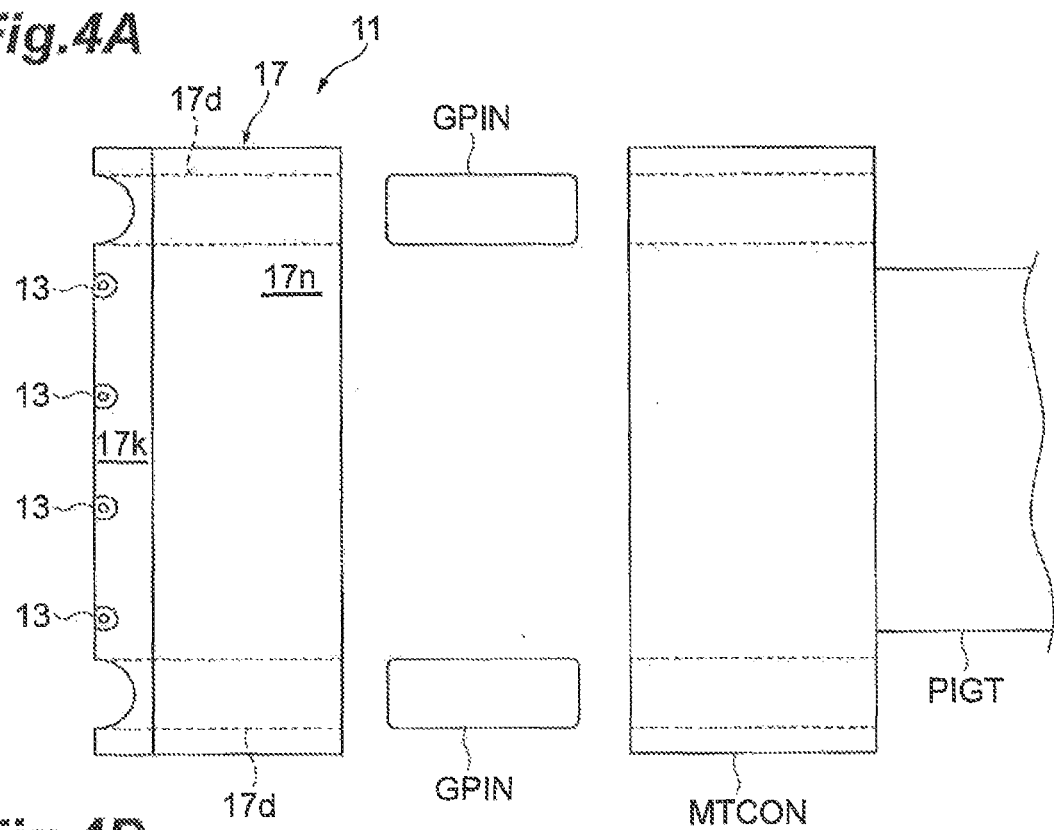
FIG. 4A is a schematic view showing the optical device and the MT connector, which are to mate with each other, according to the present embodiment.
Figure 4B:
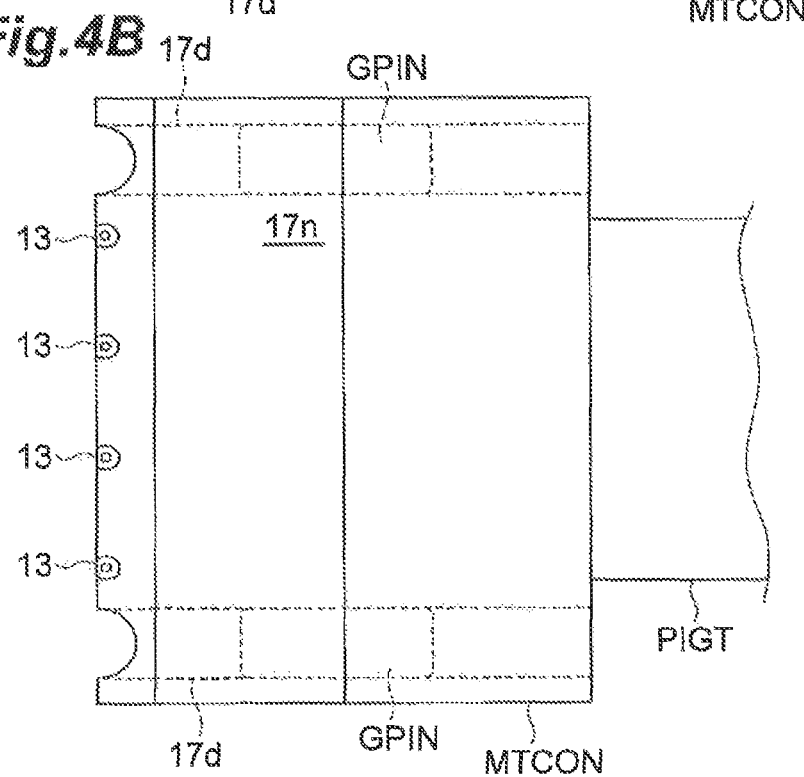
FIG. 4B is a schematic view illustrating the optical device and the MT connector, which mate with each other, according to the present embodiment.

Referring to FIG. 3B, another structure of the optical device 11 is shown. In the optical device 11 of the other structure, each optical fiber 13 extends from one end portion 17g of the holder 17 (specifically, the third end face 17k) to the fourth end face 17t of the holder 17. This structure demonstrates a stub-type optical device 11. In the present embodiment, as shown in FIGS. 4A and 4B, the fourth end face 17t can be coupled with, for example, an MT connector MTCON. The MT connector MTCON has an end surface, to be used as a connecting face, at which ends of optical fibers thereof are arranged, and as shown in FIG. 4A, the optical device 11, MT connector MTCON and the guide pins GPIN are prepared. A fiber ribbon PIGT bundling a plurality of optical fibers extends from the other end face of the MT connector MTCON. As shown in FIG. 4B, the positioning of the optical device 11 by use of the guide pins GPIN allows fiber ends arranged at the fourth end face 17t to optically couple the fiber ends arranged at the connecting end face of the MT connector MTCON.

FIGS. 5A and 5B are schematic views each illustrating an optical processing device according to the embodiment. Referring to FIGS. 5A and 5B, the optical processing device 101 includes an optical device 11 and the semiconductor optical device 103. The semiconductor optical device 103 includes one or more optical coupling elements 103a and one or more optical processing elements 103b connected to the optical coupling elements 103a. The optical coupling elements 103a are provided on the primary surface 103c of the semiconductor optical device 103. The optical device 11 is disposed on the semiconductor optical device 103. The optical fibers 13 of the optical device 11 are optically coupled to the optical coupling elements 103a of the semiconductor optical device 103 via the respective cladding sides 13e located at the second end face 17j in the holder 17. The optical processing device 101 demonstrates excellent optical coupling between the optical device 11 and the semiconductor optical device 103. Each optical coupling elements 103a may include, for example, a grating coupler GC.

As seen from the above description, the optical fibers 13 of the optical device 11 are optically coupled to the respective optical coupling elements 103a of the semiconductor optical device 103 through the second end face 17j of the holder 17. In order to show this optical coupling, a second axis Ax2 (an axis extending in the direction of an arrow ARW1) and the arrow ARW1 are depicted in FIGS. 5A and 5B. Light beams propagating through the optical fibers 13 of the optical device 11 are reflected at the ends 13a of the respective optical fibers 13, and then are incident on the optical coupling elements 103a of the semiconductor optical device 103 through the respective cladding sides 13e. The light beams emitted from the light coupling elements 103a of the semiconductor optical device 103 reach the ends 13a of the respective optical fibers 13 of the optical device 11 through their cladding sides 13e and are reflected by the ends 13a, and the light beams thus reflected propagate the respective optical fibers 13 in the optical device 11. The propagating direction intersecting with the cladding sides 13e (the second axis Ax2) form a first angle BETA with the axis NV normal to the main surface 103c, and the angle corresponds to a coupling angle between the optical coupling elements 103a of the optical semiconductor optical device 103 and the ends 13a of the optical device 11. The optical processing device 101 can reduce, as shown in FIG. 5A, the total thickness of the optical device 11 and the semiconductor optical device 103 that are connected to each other, that is, the thickness T1 of the optical processing device 101.

In order to optically couple the optical coupling elements 103a of the semiconductor optical device 103 with the ends 13a of the optical fibers 13 in the optical device 11, the inclination angle TH between the third reference plane R3 for the third end face 17k and the second reference plane R2 for the second end face 17j is associated with the coupling angle of the optical coupling elements 103a with which the optical device 11 is to be coupled. The optical device 11 makes it easy to receive light from the optical element and/or emit light to the optical element.

As shown in FIG. 5B, if necessary, the optical processing device 101 may further include a resin body 105. The resin body 105 is disposed between the optical coupling elements 103a of the semiconductor optical device 103 and the second end face 17j of the optical device 11, and the refractive index of the resin body 105 is substantially equal to the refractive index of the optical fibers 13. The resin body 105 may be made of, for example, an epoxy resin. Light beams propagating through the optical fibers 13 can pass through the resin body 105, and the light beams to be processed by the optical processing device 101 can pass through the resin body 105.

In the semiconductor optical device 103 including an Si photonics device of surface input/output type with a grating coupler GC, optical resin that has substantially the same refractive index as the optical fiber 13 and a $SiO_2$ film that is provided on the surface of the Si photonics device (the optical resin having about 1.45 to 1.5) can be used as a resin body 105. The filling of the resin body 105 can reduce the reflection loss in the optical coupling between the semiconductor optical device 103 and the optical device 11. The resin body 105 can prevent the surface roughness of the cladding sides 13e from affecting optical coupling loss.

Figure 6:
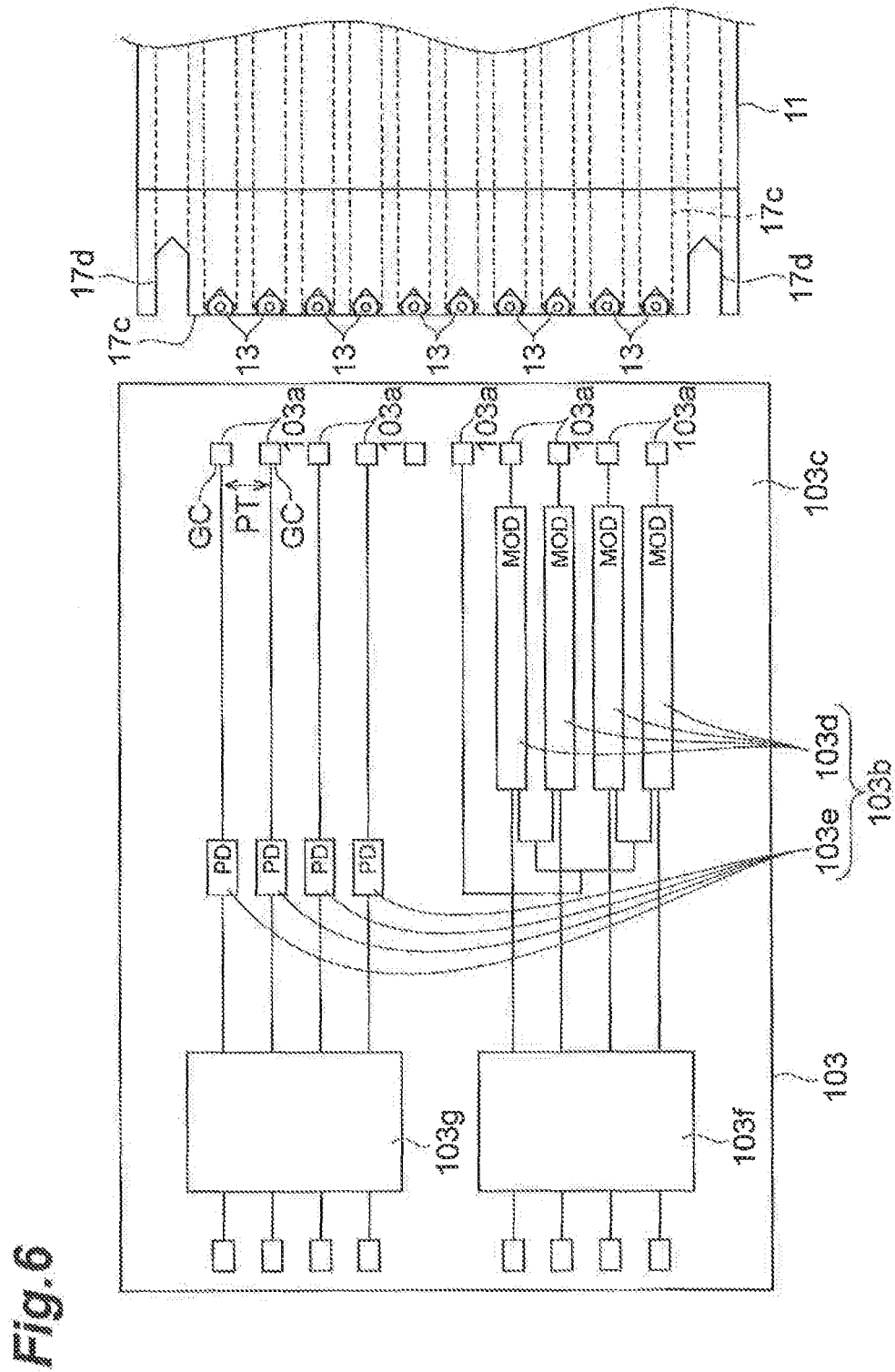
FIG. 6 is a plan view schematically showing the optical device and the silicon photonics device, which are to be coupled with each other, according to the present embodiment.
Figure 7:
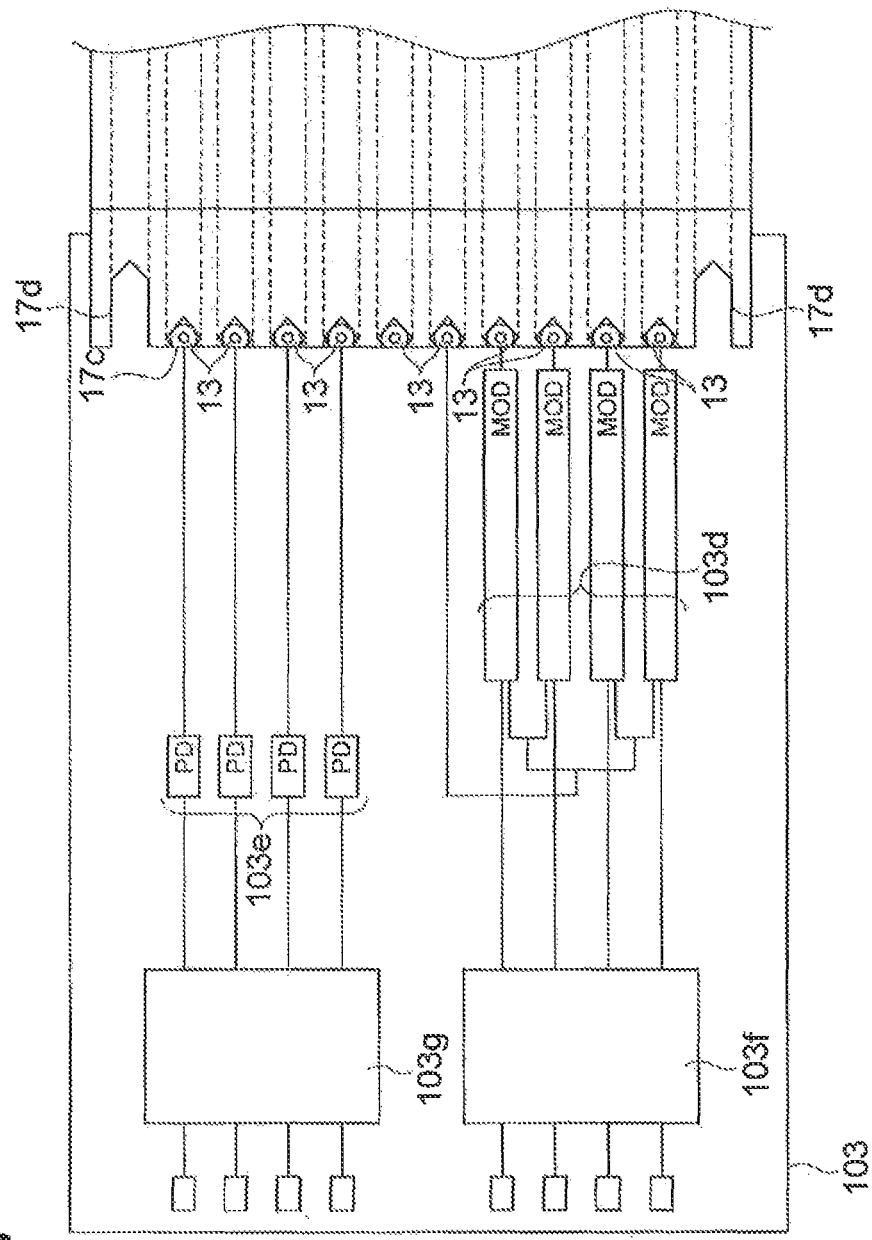
FIG. 7 is a plan view schematically showing the optical device and the silicon photonics device, which are optically coupled with each other, according to the present embodiment.

FIG. 6 is a schematic plan view showing the optical device and the silicon photonics device according to the present embodiment. FIG. 7 is a schematic plan view showing the optical device and the silicon photonics device that are optically coupled to each other according to the present embodiment. As shown in FIG. 6, the pitch of the arrangement of the optical fibers 13 in the optical device 11 is substantially equal to the pitch PT of the grating couplers GC in the silicon photonics device, referred to as the semiconductor optical device 103. As shown in FIG. 7, the optical device 11 is optically positioned on the main surface 103c of the semiconductor optical device 103 to optically couple the arrangement of the optical fibers 13 in the optical device 11 with the arrangement of the grating couplers GC in the silicon photonics device.

Referring to FIGS. 6 and 7, the grating couplers GC for the input and/or output are arranged along one side of the silicon photonics device. Four grating couplers among the grating couplers GC may be connected to the respective optical modulators 103d, such as Mach-Zehnder modulator, via the optical waveguide, and are used to output the modulated light beams. Another grating coupler among the grating couplers GC is connected to the optical modulators 103d via the optical waveguides, and is used to receive input light to be modulated. The remaining four grating couplers GC may be connected to the respective light receiving elements 103e via optical waveguides, it is used for input signal light.

In the optical transmitter, the input light beam is branched into four optical waveguides to the respective four Mach-Zehnder modulators (MODs). The Mach-Zehnder modulators (MOD) operate in response to respective electric signals for modulation each of which the modulation drive circuit 103f supplies through the conductive line. In response to the electrical signals, the Mach-Zehnder modulators (MODs) perform modulation of the input light (for example, amplitude modulation, or phase modulation). Mach-Zehnder modulators (MODs) can be connected via respective optical waveguides to the grating couplers GC, which emit the modulated light beams outward.

In the optical receiver, the light signals received by the grating couplers GC enter the respective pin photodiodes (PDs) through optical waveguides. The pin photodiodes generate respective electrical signals, such as photocurrent, corresponding to the intensities of the light signals received thereby. The electrical signals thus generated are supplied to the signal processing circuit 103g, such as transimpedance amplifier, which perform a desired processing, such as amplification thereto.

The semiconductor optical device 103 is not limited to silicon photonics elements, and may be another device, such as a surface emitting laser, a distributed feedback semiconductor laser with an oblique reflective mirror (DFB), a surface-receiving photodiode, The surface emitting laser, the DFB semiconductor laser, and the surface receiving photodiode have a coupling direction, for example, the incident direction or the emission direction perpendicular to the surface thereof. Meanwhile, the incident direction and the emission direction of a surface-coupling type Si photonics device with grating couplers GC are inclined at an angle of about 5 to 15 degrees from the direction normal to the surface of the optical element. The beam shape of the light reflected by the oblique end face spreads to diverge in the propagation in the clad of the optical fiber 13. According to the inventor's research, the distance DT shown in FIG. 5A in the range of 25 μm or less and greater than zero demonstrates high efficiency in optical coupling (−1 dB or less).

In the embodiment in which the optical fibers 13 of the optical device 11 are quartz single mode fibers and the semiconductor optical device 103 is a silicon photonics device with grating couplers GC, it is preferable that the distance ("DT" shown in FIG. 5A) between the side of the core 13c of the optical fiber 13 and the cladding side 13e of the optical fiber 13 in the second end face 17j be 25 μm or less, and that the first angle BETA formed between the second axis Ax2 and the axis NV normal to the main surfaces 103c be in the range of 5 to 15 degrees. Such an optical arrangement can demonstrate a highly efficient optical coupling between the optical device 11 and the semiconductor optical device 103. In order to provide the optical coupling with an angle within the above angular range, the second angle ALPHA formed by the second end face 17j and the third end face 17k is in the range of 42.5 to 37.5 degrees. According to the inventor's research, a smaller second angle ALPHA may cause chipping at or in the vicinity of the end 17u of a wedge that the second end face 17j and the third end face 17k form, and is likely to cause stress concentration at or in the vicinity of the connecting portion 17v that the first end face 17i and the second end face 17j meet. Because of these reasons, the optical fiber 13 may be easily damaged in mounting the optical device 11 on the semiconductor optical device 103.

Figure 8:
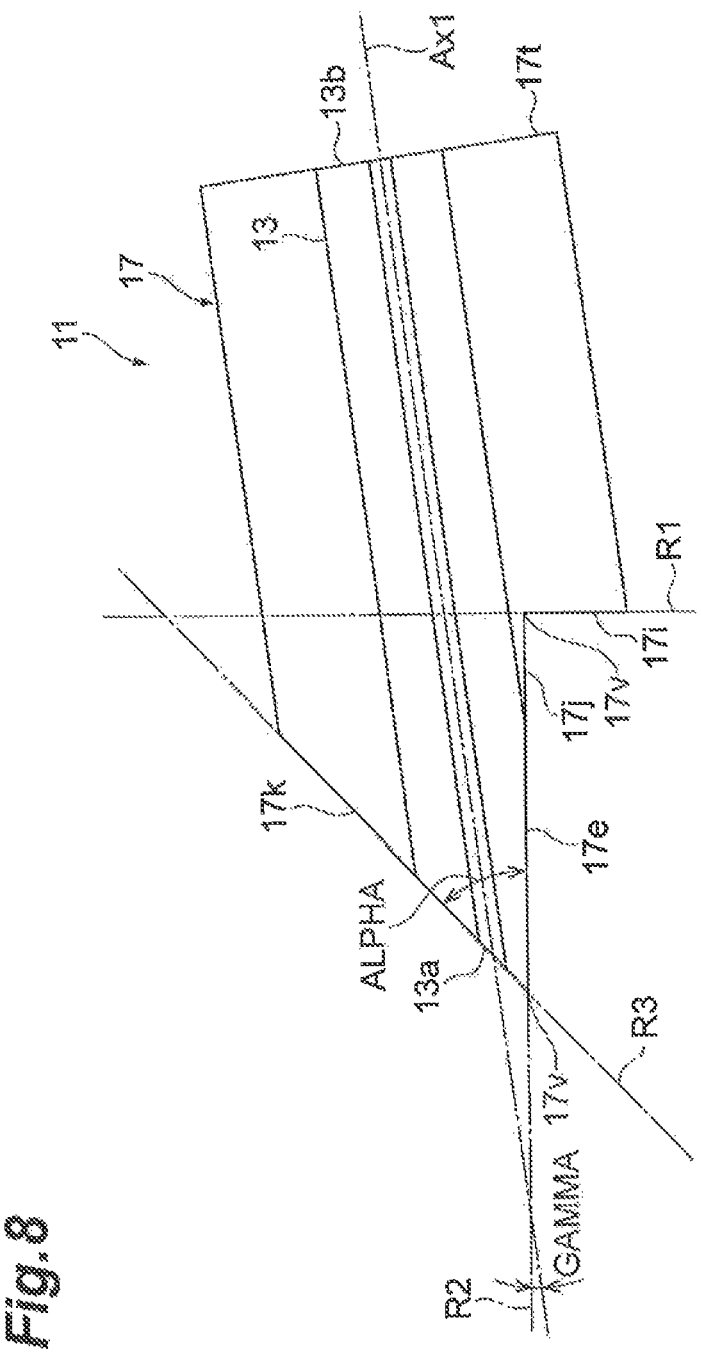
FIG. 8 is a schematic view showing another optical device according to the present embodiment.

FIG. 8 is a schematic drawing showing an optical device which can reduce the occurrence of breakage of optical fibers in the mounting process. In order to make it easy to form the second angle ALPHA with the first angle BETA shown in FIG. 5A being kept, it is preferable that the first axis Ax1 (the waveguide axis along which the optical fibers 13 in the holder 17 extend) form a third angle GAMMA, which is greater than zero with respect to the second reference plane R2 (the plane extending along the direction in which the second end face 17j extend). As compared to the optical device 11 shown in FIGS. 1A and 1B having a desired first angle BETA, this structure makes a value of the second angle ALPHA larger with the desired first angle BETA being kept. By way of example, when the first angle BETA is eight degrees, the second angle ALPHA is 41 degrees in the structure of FIGS. 1A and 1B, whereas in order to form a first angle BETA of the same value, i.e., eight degrees, the third angle GAMMA of 10 degrees allows the second angle ALPHA to be 46 degrees. The structure also allows the machining to be carried out so as to form the connecting portion 17v outside the optical fibers 13 in the holder 17. Further, the structure can prevent stress in the vicinity of the connecting portion 17v from focusing on the optical fibers 13.

Figure 9:
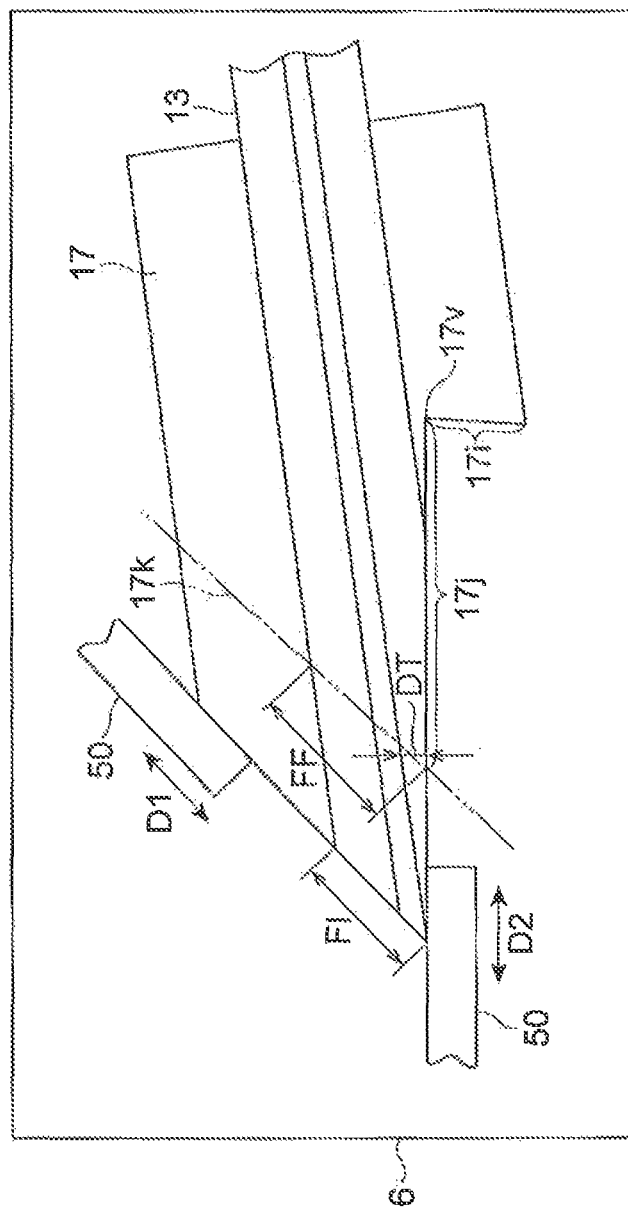
FIG. 9 is a schematic view showing still another optical device according to the present embodiment.

Moreover, the structure shown in FIG. 8 has advantages in fabrication of the oblique end face. After assembling an optical fiber part for the optical fiber 13 with a part for the holder 17 to produce the assembly, the assembly is machined with a dicing saw 50 in a dicing apparatus 6 in the two directions (D1 and D2 in sequence, as shown in FIG. 9, to form an intermediate product therefrom. The third angle GAMMA shown in FIG. 8 is associated with the second direction D2, and the angle of the cutting blade depends upon the second direction D2. The oblique face of the intermediate product is polished to complete the second end face 17j and the third end face 17k. The size of the end face of the optical fiber exposed at the oblique surface is an initial value FI in the polished intermediate product, and the size of the end face of the optical fiber is gradually increased with the progress of polishing. The size of the end face of the optical fiber at the oblique surface becomes the final value FF which can form the desired spacing DT. The size can be measured through the observation of the polished surface. The size of the end face of the optical fiber in the polishing surface can be used to detect the end of polishing that achieve the desired spacing DE This makes the control of the distance DT easy. The second end face 17*j* is formed by machining with a dicing saw. In order to provide the second end face 17*j* and the flat cladding sides 13*e*, if needed for a surface roughness of the surface thus formed, polishing may be carried out to obtain a desired optical flatness. Further, if necessary, anti-reflection coating can be applied to the cladding sides 13*e*. It is desirable that in order to suppress the scattering loss, the oblique reflective surface for the third end face 17*k* be polished to provide the reflective surface with an optical flatness.

As shown in FIGS. 10A and 10B, the holder 17 may further include a protective film 31 provided on the ends 13*a* of the optical fibers 13 arranged at the third end face 17*k*. The protective film 31 preferably comprises at least one of metal or material having a refractive index lower than that of the cores 13*c* of the optical fibers 13. The protective film 31 can prevent the resin body 105, which acts as a refractive-index adjusting member between the optical device 11 and the semiconductor optical device 103, from coming around on the third end face 17*k* to directly cover the ends 13*a* of the optical fibers 13, thereby being optically coupled with the ends 13*a* of the optical fibers 13. The protective film 31 may include, for example, a dielectric multilayer film, a metal film or a multi-layer film made of dielectric and metal. The dielectric multilayer film comprises, for example, a multilayer film of $TiO_2/SiO_2$, a multilayer film of a-$Si/SiO_2$). The metal film can include, for example. Al monolayer. The multilayer film made of dielectric and metal may include, for example, $Al_2O_3/Ag/Al_2O_3$ stack, or a $Al_2O_3/Ag$ stack, which avoids aging variation caused by oxidation of Ag.

FIGS. 11A and 11B are views showing the structure of a holder according to the present embodiment. Referring to FIGS. 11A and 11B, each of the supporting portions 17*c* of the holder 17 includes a through-hole extending from the first end face 17*i* and the third end face 17*k* in the direction from the end portion 17*g* to the other end portion 17*h*, and the optical fiber 13 is fixed to the holder 17 by the adhesive member 23 in the through-hole. The arrangement of the optical fibers 13 is determined by the arrangement of the through-holes. Further, each of the guide portions 17*d* of the holder 17 includes a through-hole extending from the first end face 17*i* and the third end face 17*k* in the direction from the end portion 17*g* to the other end portion 17*h*. For example, a guide pin is inserted into each guide portion 17*d*.

The holder 17 includes a first member 19 and a second member 21. The first member 19 has first grooves GV1 for supporting the optical fibers 13, and each of the first grooves GV1 includes a 11-th support face 19*aa* and a 12-th support face 19*ab*. The second member 21 has second grooves GV2 for supporting the optical fibers 13, and each of the second grooves GV2 has a 21-th support face 21*aa* and a 22-th support face 21*ab*. The first member 19 and the second member 21 are bonded together by the adhesive member 23 such that the first grooves GV1 and the second grooves GV2 constitute the corresponding through holes. The first member 19 has a third groove GV3 for guiding, and each of the third groove GV3 has a 13-th support face 19*ba* and a 14-th support face 19*bb*. The second member 21 has a fourth groove GV4 for guiding, and the fourth groove GV4 has a 23-th support face 21*ba* and the 24-th support face 21*bb*. The first member 19 and second member 21 are bonded together through the adhesive member 23 such that the third groove GV3 and the fourth groove GV4 constitute the through-hole. In the present embodiment, each of the first groove GV1 to the fourth groove GV4 includes, for example, a V-shaped groove.

Figure 12:
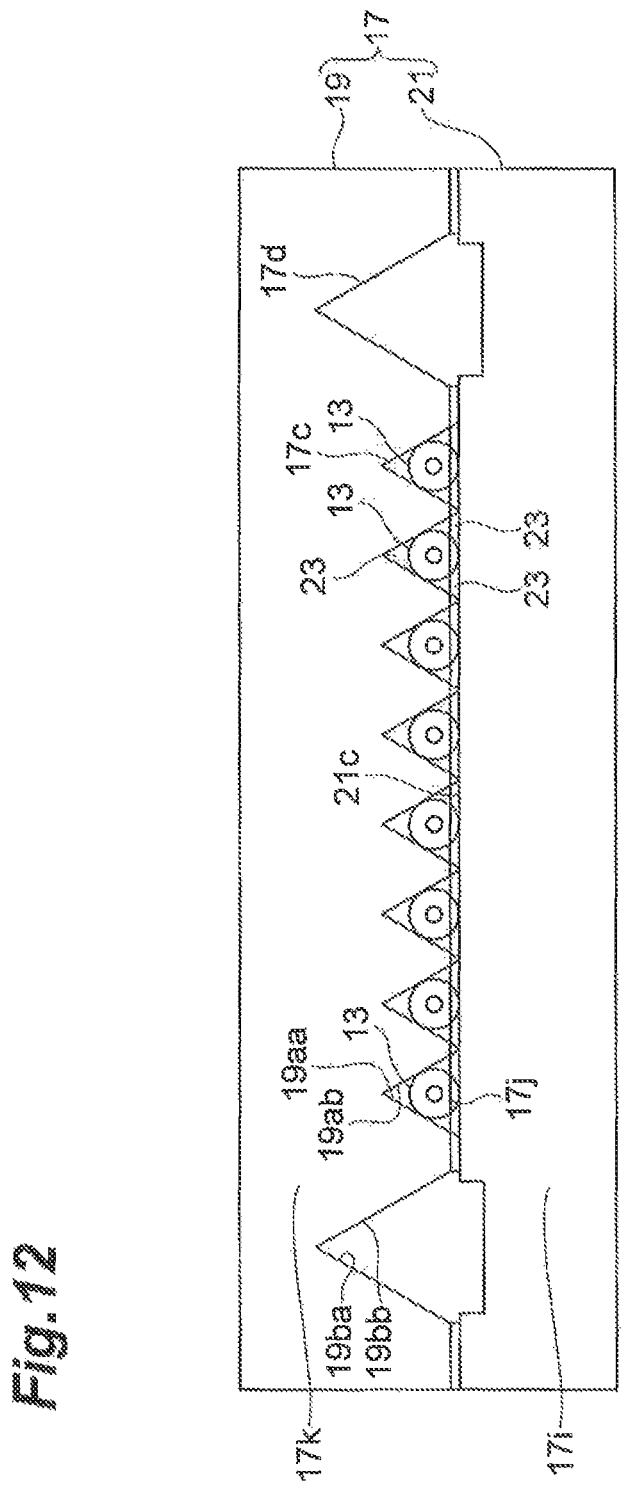
FIG. 12 is a view showing the structure of a holder according to the present embodiment.

The holder 17 may have a structure as shown in FIG. 12. Referring to FIG. 12, the first member 19 has the first grooves GV1 shown in FIGS. 11A and 11B, whereas the second member 21 may supports the optical fibers 13 by a common flat surface 21*c* which does not include any groove.

In FIG. 11A, the optical device 11 shown in FIGS. 11B and 12, the first member 19 and the second member 21 may be made of respective glass members made of heat-resistant glass. The glass members include V-shaped grooves, and in the optical device 11 shown in FIGS. 11A and 11B, the glass members of substantially the same structure are used as the first member 19 and the second member 21. These glass members sandwich the optical fibers in the V-shaped grooves, and glass parts and optical fiber parts are bonded to adhere together by the adhesive member 23, such as a heat-resistant adhesive. Such a heat-resistant adhesive includes, for example, a thermosetting epoxy adhesive, and after the curing (i.e., after having been bonded), cured epoxy adhesive exhibits a small change in volume with temperature change of the glass parts. In order to precisely align desired positions of the optical fibers in the respective V-shaped grooves, each of the optical fibers is in contact with the four oblique faces of the two V-grooves in the glass member. In order to demonstrate the support of the optical fibers, the two glass members sandwich the optical fibers without the glass members being in contact with each other to be spaced apart to form a gap of approximately 1 to 5 μm, which is formed by supporting the members with optical fibers. The V-shaped grooves and the gap between the two glass members are filled with heat-resistant adhesive. The heat-resistant adhesive is in contact with the cladding sides of the optical fibers with the exception of supported portions where the optical fibers are in contact with the V-shaped grooves. The holder 17 includes the first member 19, the second member 21 and the adhesive member 23 fully filled between the optical fiber 13. At the first end face 17*i*, the second end face 17*j* and the third end face 17*k* of the holder 17, as shown in FIGS. 11A, 11B and 12, the adhesive member 23 fills gaps between the optical fibers 13 and the supporting portions 17*c*.

In the embodiment described above, the first end face 17*i*, the second end face 17*j* and the third end face 17*k* of the holder 17 may be formed by cutting with a dicing saw. In order to form the first end face 17*i*, the second end face 17*j* and the third end face 17*k*, the dicing blade saws glass parts for the first and second members 19 and 21, the optical fiber part, and the cured heat-resistant adhesive. Experiments conducted by the inventor reveal that, as compared to the structure in which the four faces of the paired V-shaped grooves support each optical fiber, the structure in which three faces constituted by one V-shaped groove and one flat surface 21*c* support an optical fiber can reduce the occurrence of peeling-off of the adhesive in the grooves and chipping of the optical fiber part, which are caused by the cutting. Research conducted by the inventor also reveals the structure shown in FIG. 12 can reduce the occurrence of the peering-off and the chipping because the amount of processing of the supporting portion 17*c* of a groove shape becomes small in the process of forming the first end face 17*i*, the second end face 17*j* and the third end face 17*k* of the holder 17.

Figure 13:
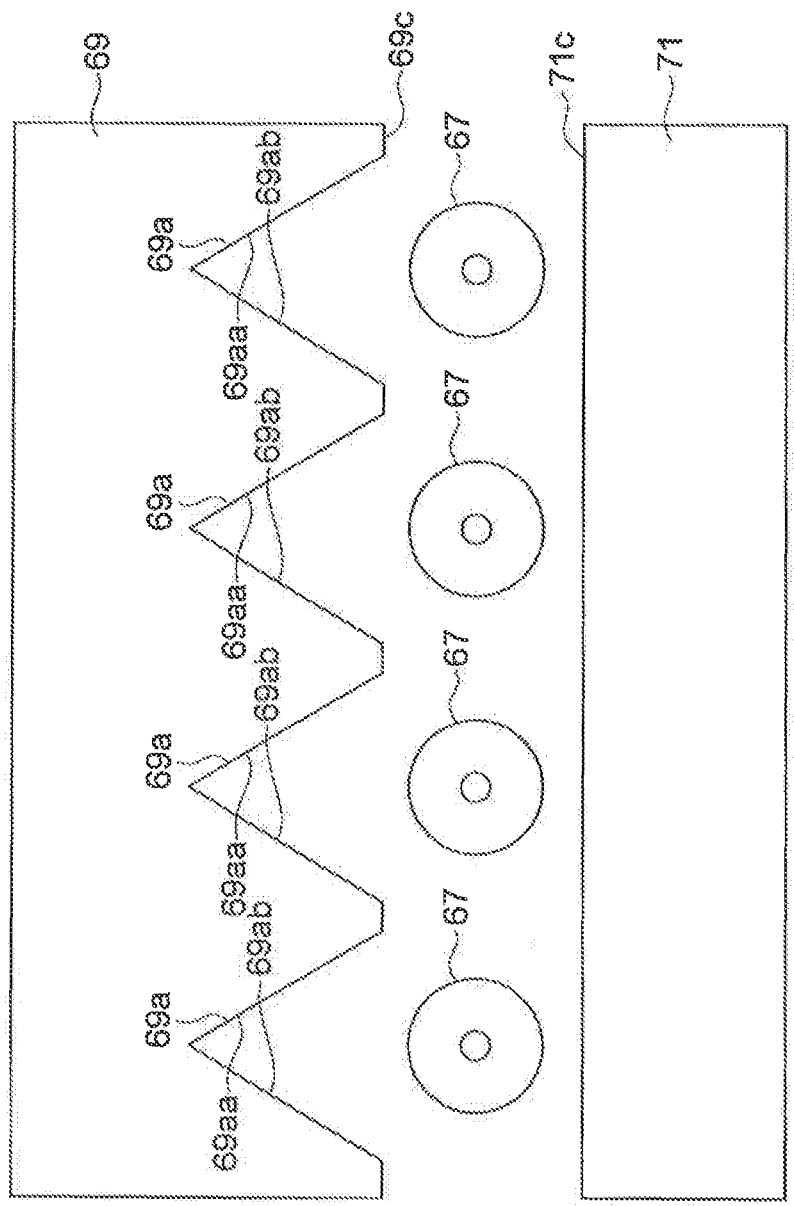
FIG. 13 is a view showing a major step in a method for fabricating an optical device according to an embodiment of the present invention.

With reference to FIGS. 13 to 18, a description will be given of the major processes in a method of fabricating an optical device 11. As shown in FIG. 13, a first part 69 corresponding to the first member 19, and a second part 71 corresponding to the second member 21, and optical fiber parts 67 corresponding to the optical fibers 13 are prepared.

In the present embodiment, the first part 69 includes support grooves 69a corresponding to the first grooves GV1 for supporting the optical fibers 13, and each of the support grooves 69a includes a first support face 69aa and a second support face 69ab corresponding to the 11-th support face 19aa and the 12-th support face 19ab, respectively. The support groove 69a may be, for example, a V-shaped groove. The support grooves 69a are provided on the surface 69c of the first part 69. The second part 71 has a third support face 71c, which is wider than the width of the arrangement of the support grooves 69a of the first part 69.

Figure 14:
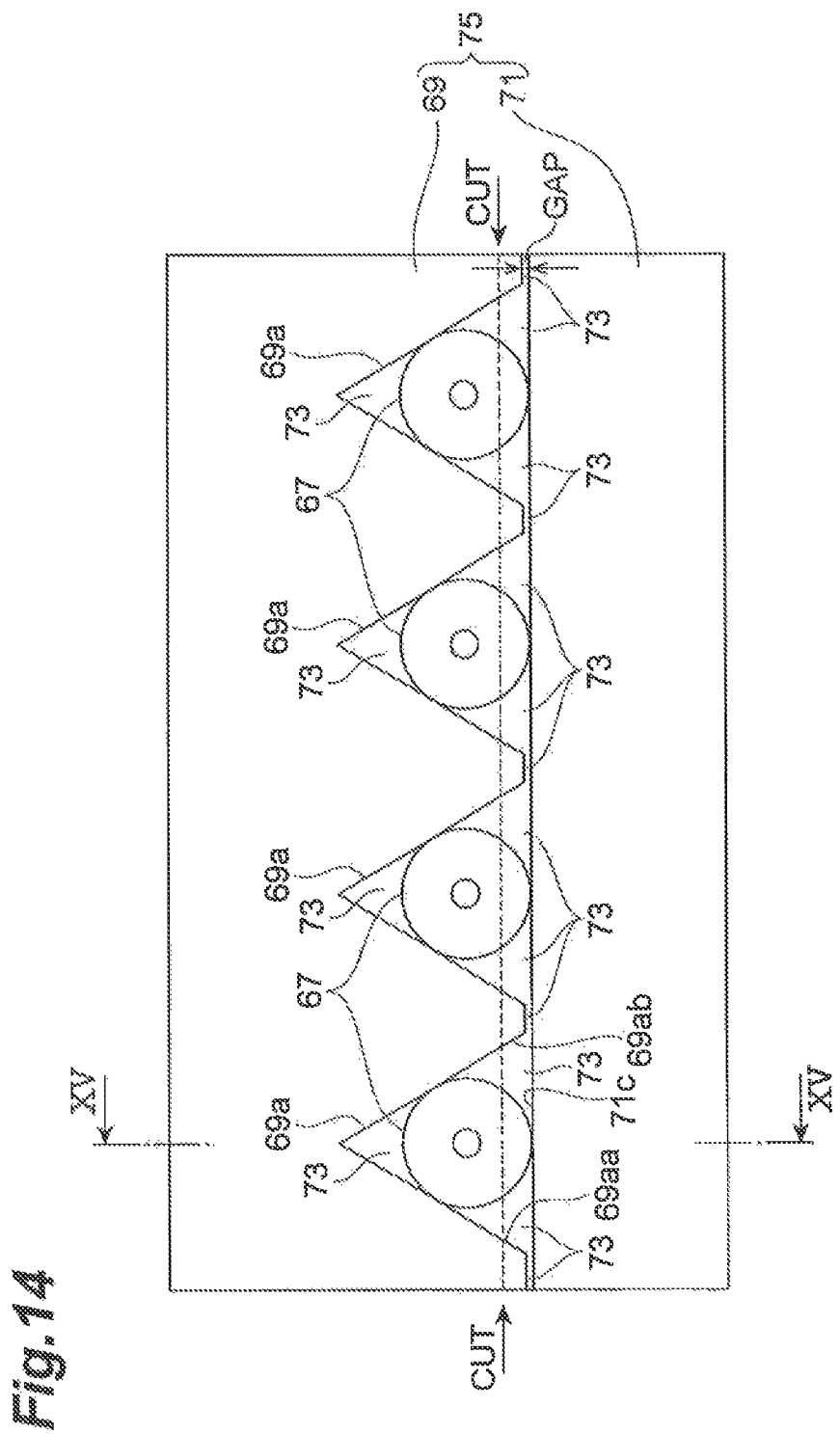
FIG. 14 is a view showing a major step in the fabricating method according to the embodiment of the present invention.
Figure 15:
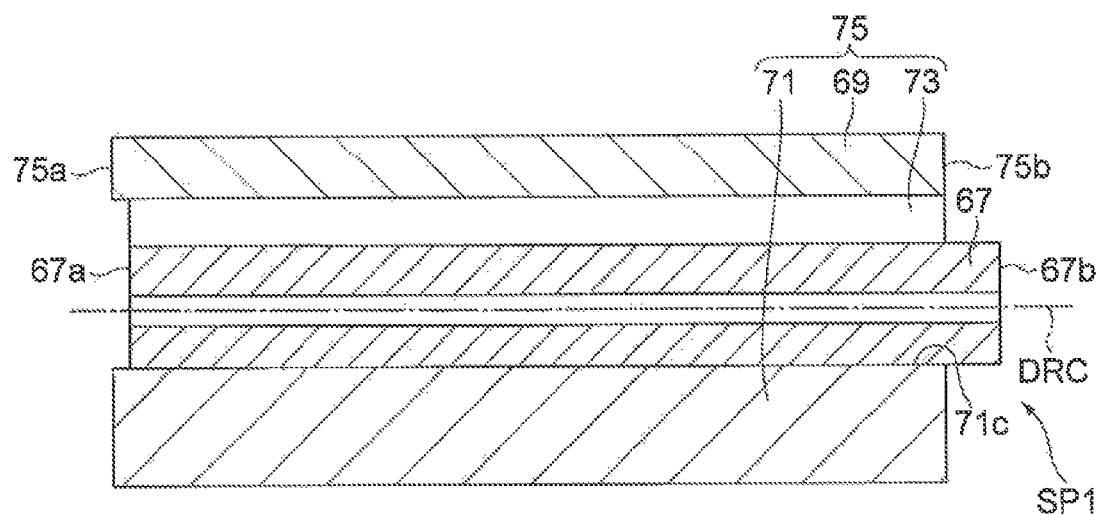
FIG. 15 is a view showing a major step in the fabricating method according to the embodiment of the present invention.

As shown in FIG. 14, the optical fiber parts 67 are disposed in the respective support grooves 69a such that the optical fiber parts 67 are sandwiched between the first part 69 and second part 71. Gaps formed between the first part 69 and the second part 71 are referred to as "GAP." Adhesive is applied such that the gaps between the optical fiber parts 67 and the first and the second parts 69 and 71 are filled with the adhesive member 73. This step forms the first body part SP1. The first body part SP1 includes a support 75 and optical fiber parts 67. The support 75 is composed of the adhesive member 73, and the first and second parts 69 and 71 that are bonded to each other by the adhesive member 73. As shown in FIG. 15, the support 75 has one end 75a and another end 75b. The optical fiber parts 67 are situated within the support member 75 with being supported by the support member 75, and extend in a first direction DRC from the one end 75a to the other end 75b. In view of processing of the end face, the ends 67a of the optical fiber parts 67 set back far from the one end 75a, and the other ends 67b of the optical fiber parts 67 are projected from the other end 75b. FIG. 15 shows a cross-sectional view taken along line XV-XV in FIG. 14.

Figure 16:
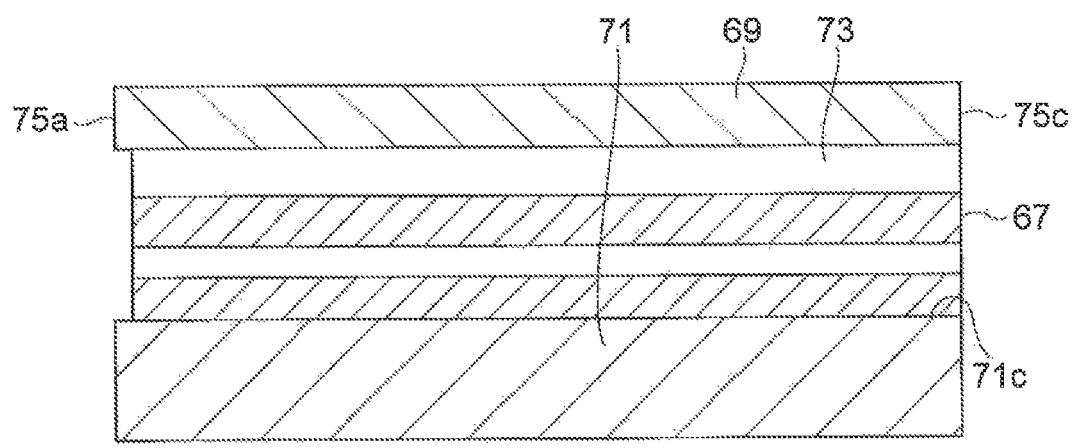
FIG. 16 is a view showing major steps in the fabricating method according to the embodiment of the present invention.

As shown in FIG. 16, when making an optical device of a stub type, the other end 75b of the support 75 is polished to form a polished end face 75c in the support 75. The support 75 of the first body part SP1 has one end 75a and the polished end face 75c.

Figure 17:
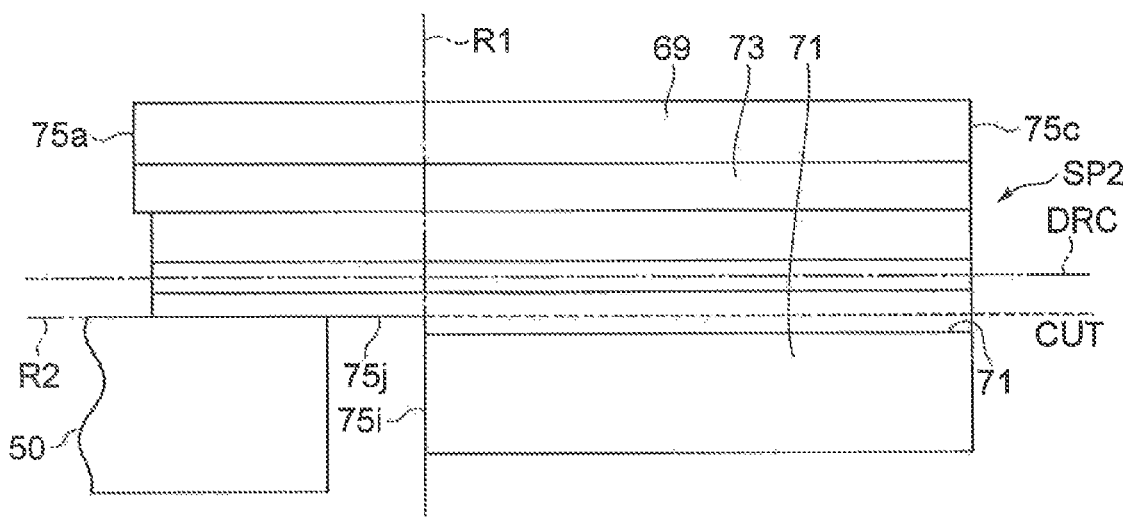
FIG. 17 is a view showing a major step in the fabricating method according to the embodiment of the present invention.

As shown in FIG. 17, after producing the first body part SP1, in the present embodiment, the support 75 and the one end 75a of the optical fiber parts 67 are processed with a dicing saw 50 in a dicing apparatus to form the second body part SP2 having a first face 75i and a second face 75. The first face 75i extends along the first reference plane R1 intersecting a first direction DRC. The second face 75j extends from the end 75a in the direction from the end 75a to the other end 75b along the second reference plane R2 that intersect the first reference plane R1. In the present embodiment, the first reference plane R1 can be substantially perpendicular to the first direction DRC, the second reference plane R2 can extend substantially parallel to the first direction DRC. Cutting-into with the dicing saw 50 along the first reference plane R1 is carried out so as to form a first face 75i. The depth of the cut-into is shallower than the depth indicated by line CUT by the thickness of the blade of the dicing saw 50 that are used to form the second face 75j. Cutting with the blade of the dicing saw 50 is carried out to form a second face 75j along the second reference plane R2. The depth of this cutting is determined such that the blade edge of the dicing saw 50 is to reach the portion formed by the cutting process that forms the first face 75i. The position of the second reference plane R2, in other words, a spot where the blade of the dicing saw 50 is to cut in in the cutting process is positioned such that the cladding of the optical fiber part 67 is machined in the first direction DRC outside of the core of the optical fiber part 67. This position is indicated by the line CUT shown in FIGS. 14 and 17.

Figure 18:
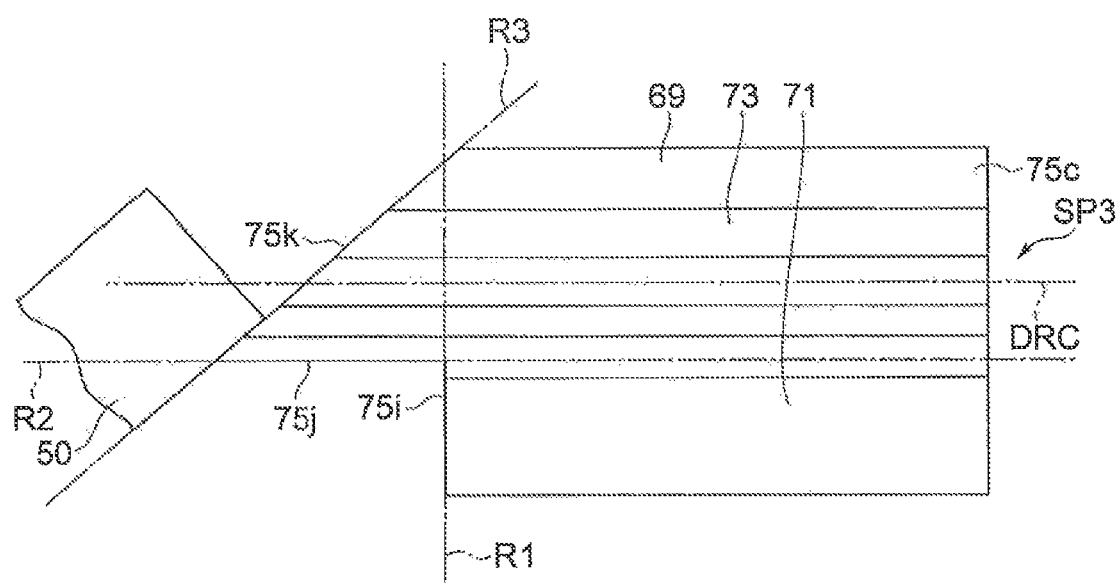
FIG. 18 is a view showing a major step in the fabricating method according to this embodiment.

As shown in FIG. 18, after producing the second body part SP2, in the present embodiment, the optical fiber parts 67 and the one end 75a of the support 75 are machined with the dicing saw 50 of the dicing apparatus to form a third body part SP3 having a third face 75k. The third face 75k extends along the third reference plane R3 inclined to the first reference plane R1 and the second reference plane R2.

Polishing the third face 75k of the third body part SP3 makes it possible to reduce the roughness of the surface formed with the dicing saw 50. If necessary, the second face 75j of the third body part SP3 may be polished to reduce the roughness of the surface formed by the dicing saw 50. After the above process, the major steps in the method for fabricating the optical device 11 are completed.

In the manufacturing method, the first body part SP1 is is processed with a dicing apparatus to form the second body part SP2 having the first face 75i extending along the first reference plane R1, and the second face 75j extending along the second reference plane R2. The dicing saw 50 in the dicing apparatus is positioned to cut into the clad of the optical fiber parts 67 outside of the cores of the optical fiber parts 67 located at the one end, thereby forming the second face 75j along the second reference plane R2. This cutting-into causes the claddings of the optical fiber parts 67 to appear on the second side 75j. The depth of the cut defines the length of the cladding sides 13e.

As seen from the above description on the fabricating process, the first face 75i, the second face 75j and the third face 75k correspond to, for example, the first end face 17i, the second end face 17j and the third end face 17k, respectively, shown in FIG. 1. Accordingly, the ends of the optical fiber parts 67 appear at the first face 75i (the first end face 17i); the cladding sides of the optical fiber parts 67 appear at the second face 75j (the second end face 17j); and the end faces of the optical fiber parts 67 are located at the third face 75k (third end face 17k). In the above fabricating method, the first body part SP1 is machined to form the first face 75i at which the end faces of the optical fiber parts 67 appear, and the second face 75j at which the cladding sides of the optical fiber parts 67 appear. In addition, the second body part SP2 is machined to form the third face 75k at which the end faces of the optical fiber parts 67 are located. The third face 75k meets the second face 75j to form an acute angle.

Having described and illustrated the principle of the invention in a preferred embodiment thereof, it is appreciated by those having skill in the art that the invention can be modified in arrangement and detail without departing from such principles. We therefore claim all modifications and variations coming within the spirit and scope of the following claims.

What is claimed is:

1. An optical device comprising:
one or more optical fibers; and
a holder including one end portion, an other end portion, and a supporting portion supporting the optical fibers, the supporting portion extending from the one end portion in a direction of a first axis, the first axis extending from the one end portion to the other end portion;
the one end portion including a first end face, a second end face and a third end face, the first end face extending along a first reference plane from a side of the holder to cladding regions of the optical fibers, the first reference plane intersecting with the first axis, the second end face extending along a second reference plane, the second reference plane extending from the one end portion to the other end portion, and the third end face extending along a third reference plane, the third reference plane being inclined at an angle of less than 90 degrees and more than zero degrees with respect to the first axis, the cladding regions of the optical fibers being disposed at the second end face, the optical fibers having respective tips disposed at the third end face, the second end face of the holder including 21-th areas made of material of the holder, and the third end face of the holder including a 31-th area surrounding the tips of the optical fibers.

2. The optical device according to claim 1, wherein the optical fibers are arranged along a reference plane intersecting with the one end portion and the other end portion, the 21-th areas of the second end face of the holder are located between the cladding regions of the optical fibers, and the tips of the optical fibers are arrayed at a connecting edge which the second end face and the third end face share.

3. The optical device according to claim 1, wherein the holder has a guiding portion, and the guiding portion extends from the one end portion to the other end portion in the direction of the first axis.

4. The optical device according to claim 1, wherein the holder further includes a protective film disposed on the third end face, and the protective film includes at least one of metal or material having a refractive index lower than that of the optical fibers.

5. The optical device according to claim 1, wherein each of the optical fibers has a first portion and a second portion, the first portion extends in the holder, and the second portion extends outward from the other end portion.

6. The optical device according to claim 1, wherein each of the optical fibers extends from the one end portion to the other end portion in the holder.

7. An optical processing device comprising:

a semiconductor optical device including an optical coupling element and an optical processing element, the optical processing element being connected to the optical coupling element; and an optical device provided on the semiconductor optical device, the optical device comprising:

one or more optical fibers; and a holder including one end portion, an other end portion, and a supporting portion supporting the optical fibers, the supporting portion extending from the one end portion in a direction of a first axis, the first axis extending from the one end portion to the other end portion, the one end portion including a first end face, a second end face and a third end face, the first end face extending along a first reference plane from a side of the holder to cladding regions of the optical fibers, the first reference plane intersecting with the first axis, the second end face extending along a second reference plane, the second reference plane extending from the one end portion to the other end portion, and the third end face extending along a third reference plane, the third reference plane being inclined at an angle of less than 90 degrees and more than zero degrees with respect to the first axis, the cladding regions of the optical fibers being disposed at the second end face, the optical fibers having respective tips disposed at the third end face, the second end face of the holder including 21-th areas made of material of the holder, and the third end face of the holder including a 31-th area surrounding the tips of the optical fibers, the optical coupling element being coupled to one of the optical fibers of the optical device through the second end face.

8. The optical processing device according to claim 7, further comprising a resin body provided between the second end face of the optical device and the optical coupling element of the semiconductor optical device, the resin body being optically transparent in a wavelength of light to be processed by the optical processing device.

9. A method for fabricating an optical device comprising the steps of:

forming a first body part including a supporting member and an optical fiber part, the supporting member having one end and an other end, the optical fiber part being supported in the supporting member by the supporting member, and the optical fiber part extending in the supporting member in a first direction from the one end to the other end, after forming the first body part, processing the optical fiber part and the one end of the supporting member to form a second body part including a first face and a second face, the first face extending along a first reference plane intersecting with the first direction, the second face extending in a direction from the one end to the other end along a second reference plane intersecting with the first reference plane, and after forming the second body part, processing the one end of the supporting member and the optical fiber part to form a third body part including a third face, the third face extending along a third reference plane inclined with respect to the first and second reference planes, the second face including a cladding side of the optical fiber part, the third face including an end face of the optical fiber part.

* * * * *